US011339653B1

(12) United States Patent
Sollami

(10) Patent No.: US 11,339,653 B1
(45) Date of Patent: *May 24, 2022

(54) NON-ROTATING BIT/HOLDER WITH TIP INSERT

(71) Applicant: The Sollami Company, Herrin, IL (US)

(72) Inventor: Phillip Sollami, Herrin, IL (US)

(73) Assignee: The Sollami Company, Herrin, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,197

(22) Filed: Jan. 13, 2020

Related U.S. Application Data

(63) Continuation-in-part of application No. 16/138,737, filed on Sep. 21, 2018, and a continuation-in-part of application No. 16/138,757, filed on Sep. 21, 2018, now abandoned, and a continuation-in-part of application No. 15/970,070, filed on May 3, 2018, and a continuation-in-part of application No. 15/960,728, filed on Apr. 24, 2018, now Pat. No. 10,876,402, and a continuation-in-part of application No. 15/950,676, filed on Apr. 11, 2018, and a continuation-in-part of application No. 15/923,051, filed on Mar. 16, 2018, now Pat. No. 10,794,181, which is a continuation-in-part of application No. 14/676,364, filed on Apr. 1, 2015, now Pat. No. 9,976,418.

(60) Provisional application No. 62/800,891, filed on Feb. 4, 2019, provisional application No. 61/974,064, filed on Apr. 2, 2014.

(51) Int. Cl.
*E21C 35/183* (2006.01)
*B23B 27/20* (2006.01)
*B28D 1/18* (2006.01)

(52) U.S. Cl.
CPC ........ *E21C 35/183* (2013.01); *E21C 35/1835* (2020.05); *E21C 35/1837* (2020.05); *B23B 27/20* (2013.01); *B23B 2226/315* (2013.01); *B23B 2251/50* (2013.01); *B28D 1/186* (2013.01)

(58) Field of Classification Search
CPC .. E21C 35/1833; E21C 35/1835; E21C 35/18; E21C 35/183; E21C 35/1831; E21C 35/1837; E21B 10/50–58; B23B 27/20; B23B 2226/315; B23B 2251/50; B28D 1/186

See application file for complete search history.

(56) References Cited

U.S. PATENT DOCUMENTS 2,810,567 A  10/1957 Kirkham
3,342,531 A  9/1967 Krekeler
(Continued)

FOREIGN PATENT DOCUMENTS

GB  1218308  1/1971

*Primary Examiner* — Janine M Kreck
*Assistant Examiner* — Michael A Goodwin
(74) *Attorney, Agent, or Firm* — Mercedes V. O'Connor; Rockman Videbeck & O'connor

(57) ABSTRACT

A diamond coated tip for a non-rotatable bit/holder for road milling operations that includes an overlay of diamond material and a base. An outer surface of the overlay including a tip, at least two parabolic sections, and a generally cylindrical section. The overlay can also include an overfill portion of adjacent the generally cylindrical section.

20 Claims, 35 Drawing Sheets

(56) References Cited

U.S. PATENT DOCUMENTS

| | | | | |
|---|---|---|---|---|
| 5,161,627 | A | * | 11/1992 | Burkett ................. E21C 35/183 299/111 |
| 6,220,376 | B1 | * | 4/2001 | Lundell .................. E21B 10/56 175/430 |
| 9,976,418 | B2 | * | 5/2018 | Sollami ................. E21C 35/183 |
| 10,995,614 | B1 | * | 5/2021 | Sollami ................. E21C 35/183 |
| 2002/0063467 | A1 | | 5/2002 | Taitt |
| 2010/0025114 | A1 | * | 2/2010 | Brady .................... E21B 10/36 175/57 |
| 2017/0043452 | A1 | * | 2/2017 | Daniels ............. B24D 18/0009 |
| 2020/0157890 | A1 | * | 5/2020 | Cuillier De Maindreville ............ E21B 10/55 |

* cited by examiner

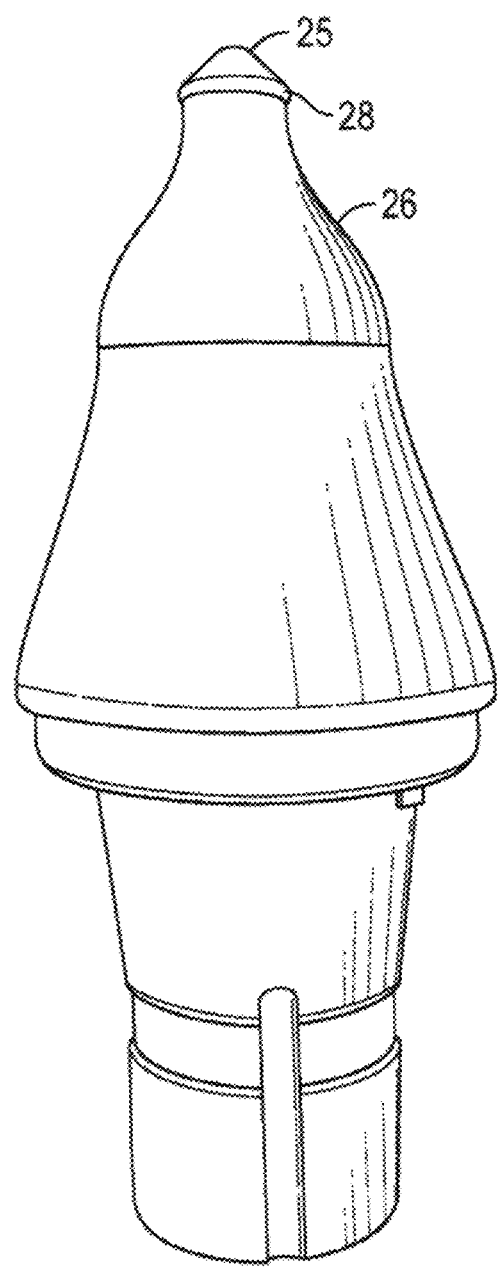
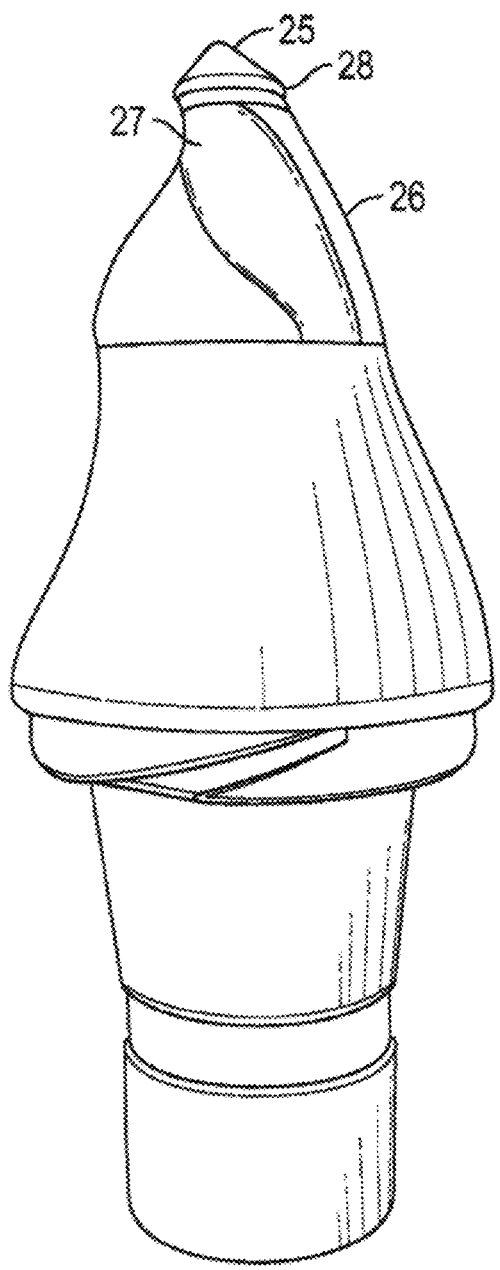
FIG. 4
(Prior Art)
FIG. 5
(Prior Art)

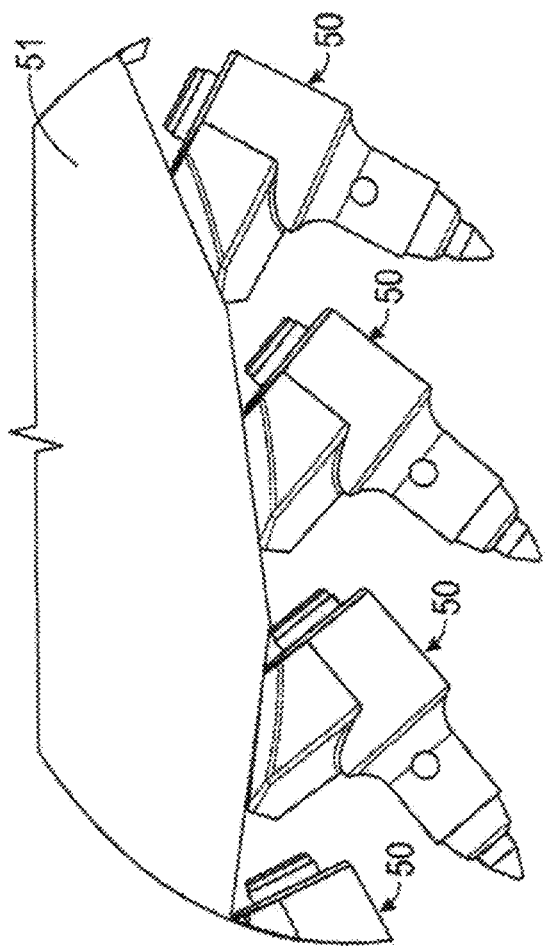
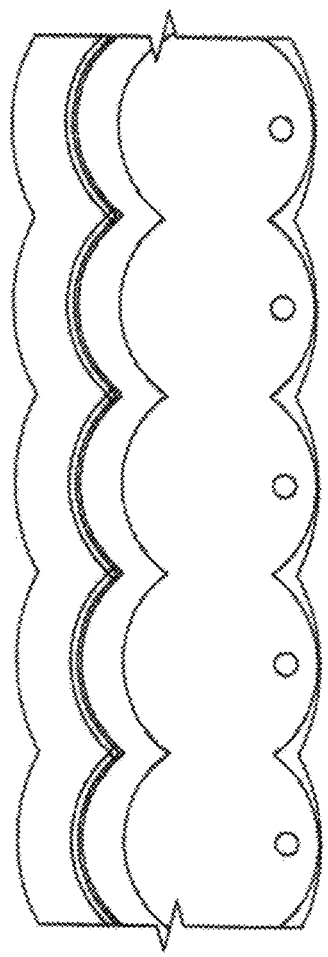
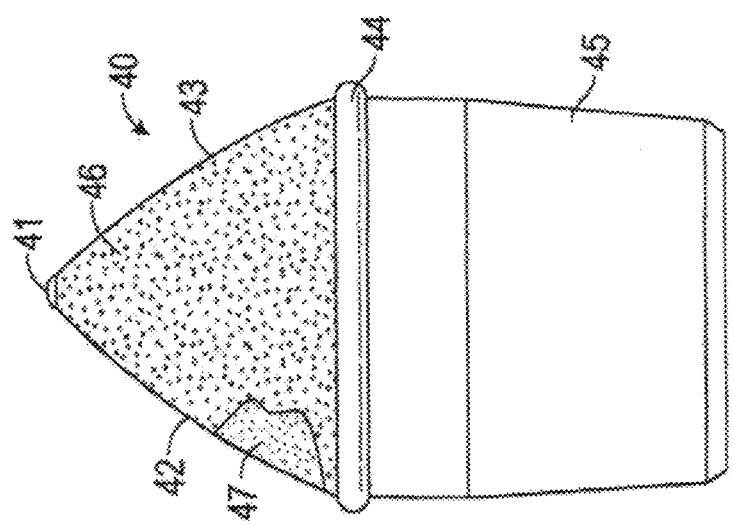

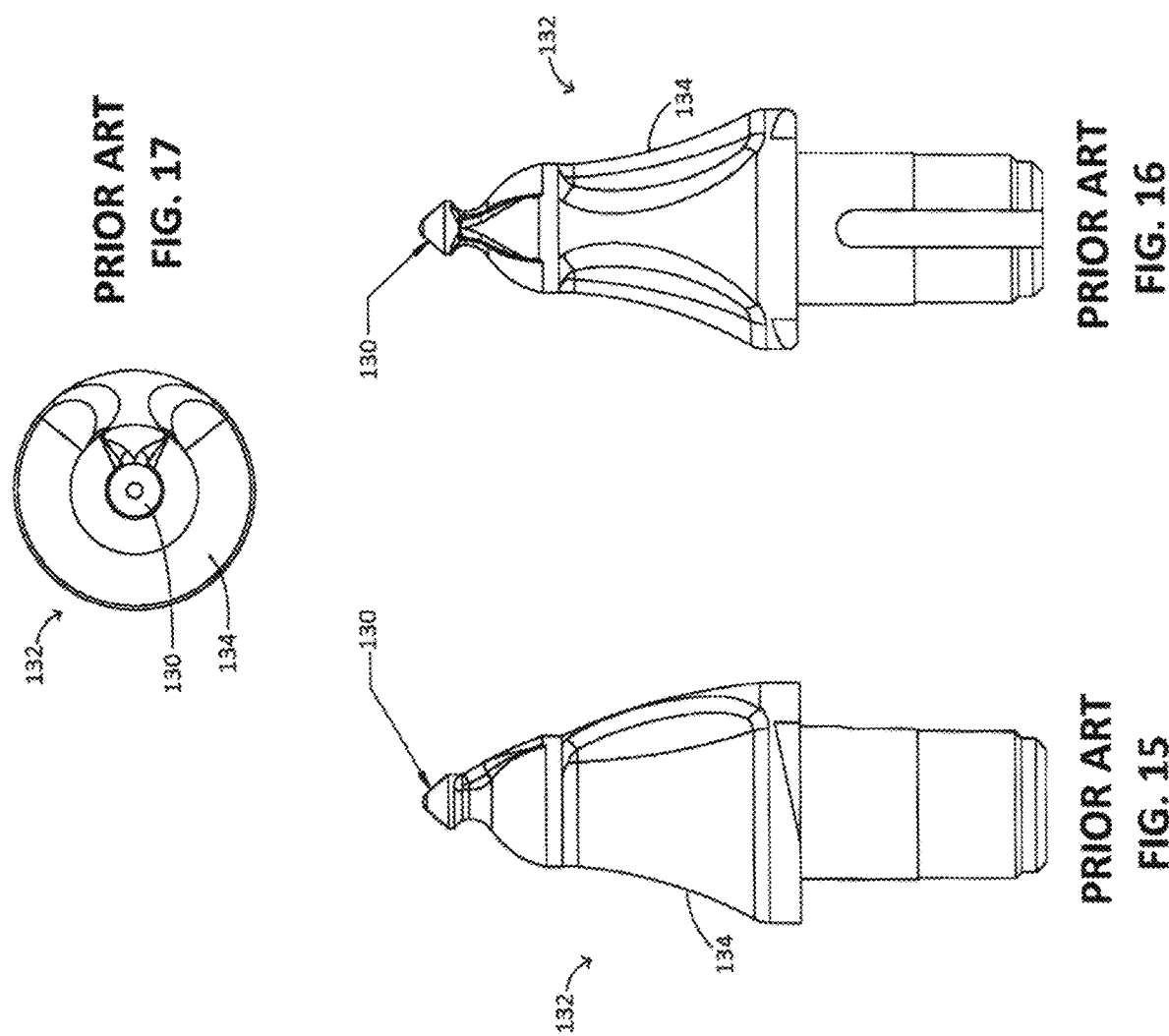

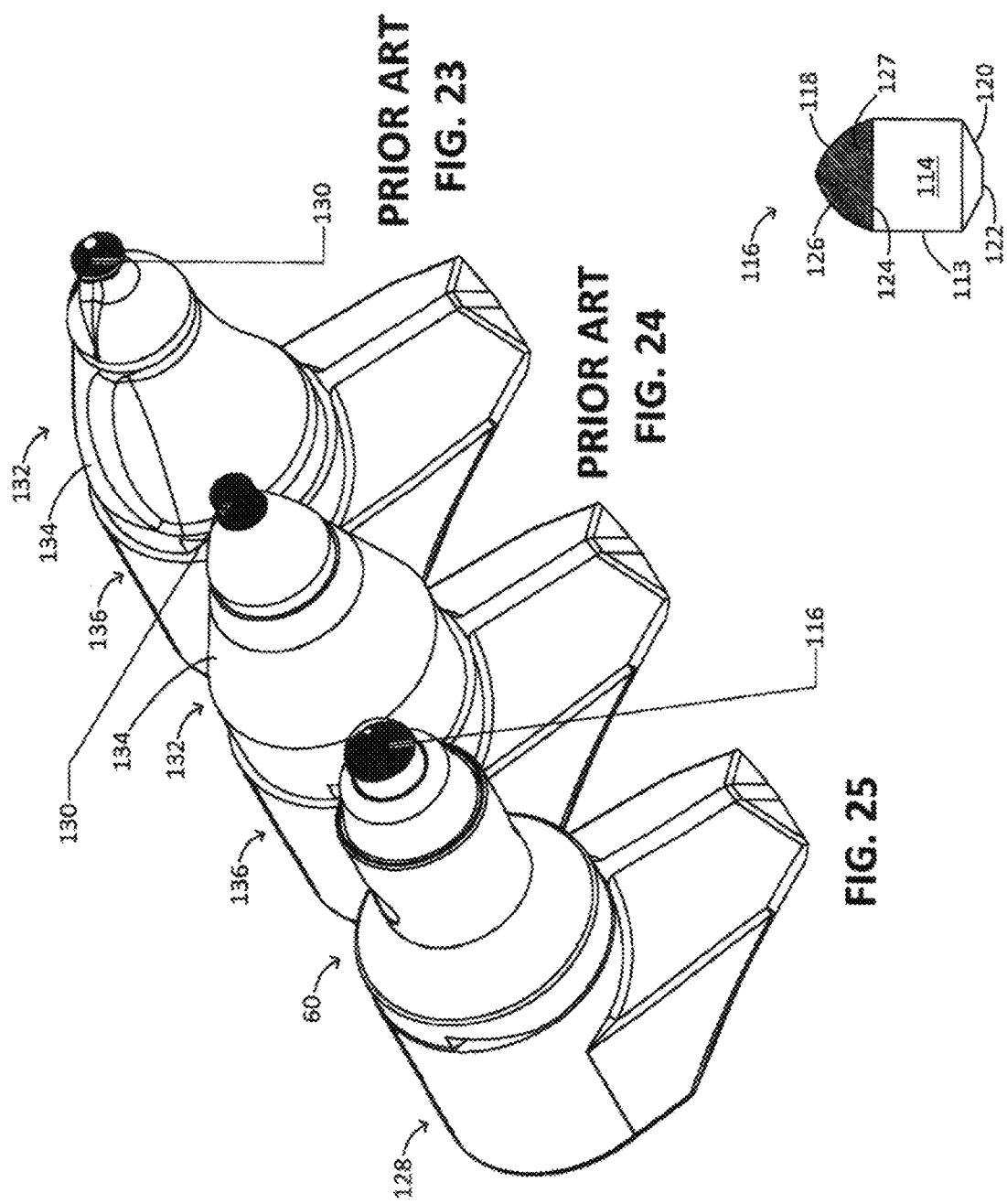

DETAIL A

DETAIL B

DETAIL C

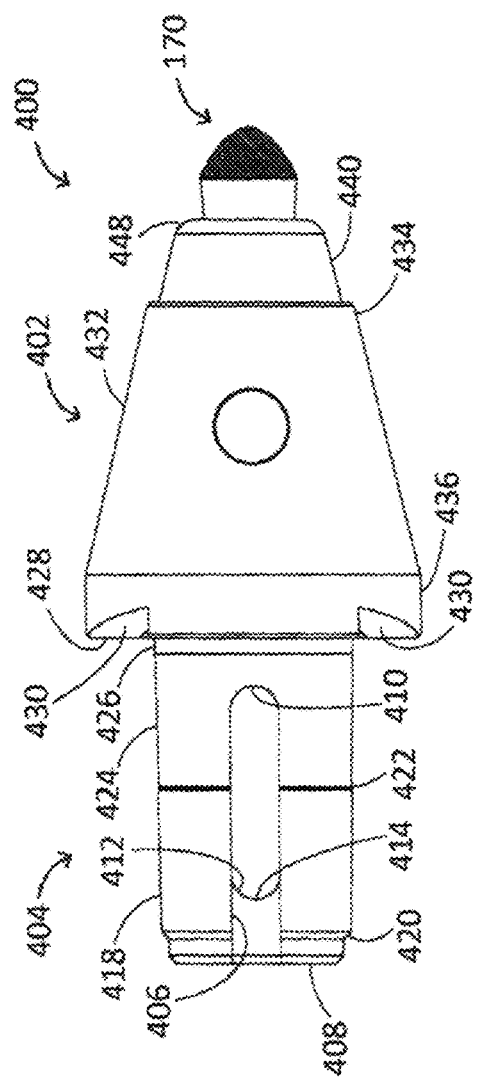
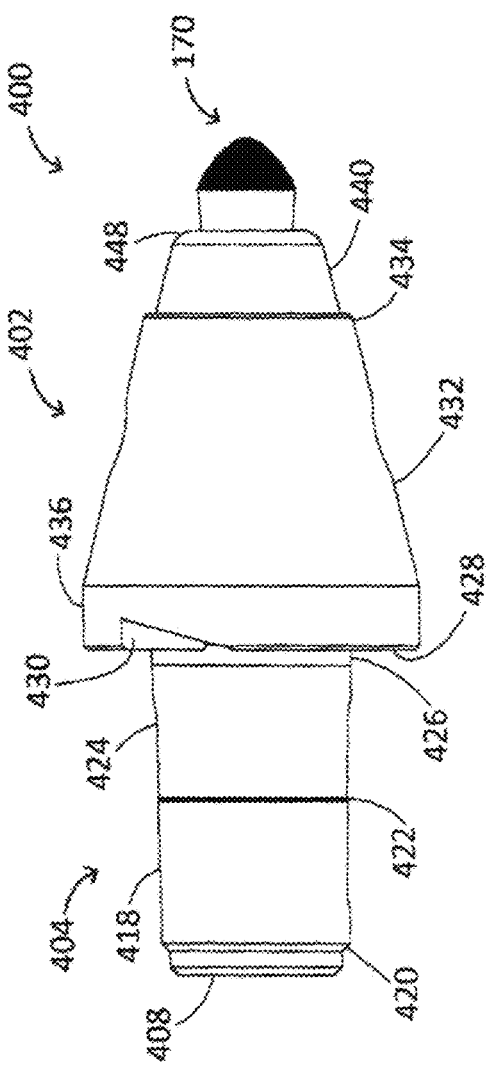

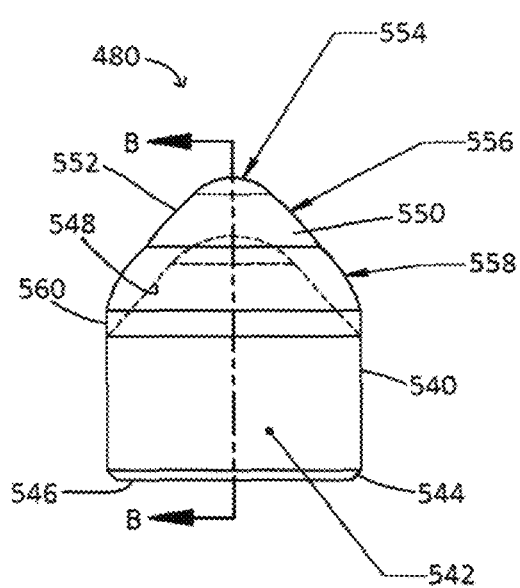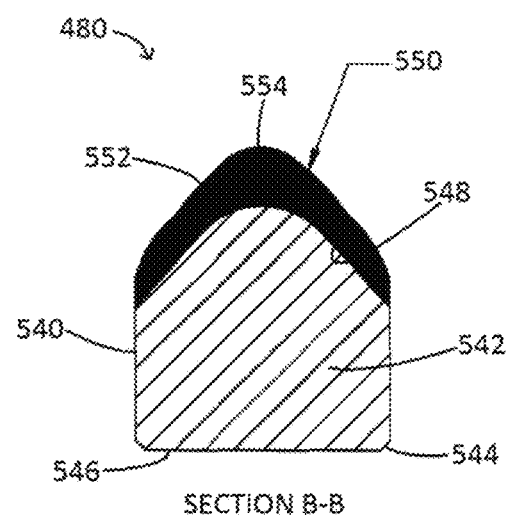
FIG. 56
FIG. 57

DETAIL D

SECTION D-D

DETAIL E

NON-ROTATING BIT/HOLDER WITH TIP INSERT

CROSS-REFERENCE TO RELATED APPLICATION(S)

This application claims priority to U.S. Provisional Application No. 62/800,891, filed Feb. 4, 2019, claims priority to U.S. Provisional Application No. 61/974,064, filed Apr. 2, 2014, claims priority to and is a continuation-in-part of U.S. Non-provisional application Ser. No. 14/676,364, filed Apr. 1, 2015, now U.S. Pat. No. 9,976,418, issued May 22, 2018, claims priority to and is a continuation-in-part of U.S. Non-provisional application Ser. No. 15/923,051, filed Mar. 16, 2018, claims priority to and is a continuation-in-part of U.S. Non-provisional application Ser. No. 15/950,676, filed Apr. 11, 2018, claims priority to and is a continuation-in-part of U.S. Non-provisional application Ser. No. 15/970,070, filed May 3, 2018, claims priority to and is a continuation-in-part of U.S. Non-provisional application Ser. No. 15/960,728, filed Apr. 24, 2018, claims priority to and is a continuation-in-part of U.S. Non-provisional application Ser. No. 16/138,737, filed Sep. 21, 2018, and claims priority to and is a continuation-in-part of U.S. Non-provisional application Ser. No. 16/138,757, filed Sep. 21, 2018, to the extent allowed by law and the contents of which are incorporated herein by reference in their entireties.

TECHNICAL FIELD

This disclosure relates to non-rotating bit/bit holder combinations and, more particularly, to such a combination utilizing a PCD diamond layered tip insert.

BACKGROUND

As basic infrastructure created in the 20th Century ages and wears, machinery for rejuvenating or replacing that infrastructure has become more important. While mining and trenching operation machinery may be included in this technology, road milling machinery, down hole tools in the oil well industry, and other similar industries area are, thus far, the most prolific use of the instant machinery.

Road milling equipment utilizes a rotating drum having a plurality of bit assemblies removably mounted on the outside of the drum in spiral or chevron orientation. A typical rotating drum has a diameter of between 42 and 54 inches and includes a plurality of mounting blocks generally secured thereto by welding in spiral or chevron patterns. The patterns noted provide for the bit blocks to be mounted behind and slightly axially to the side of one another such that the bits or combination bit/holders mounted in each bit block may have the tips of the bits positioned in close proximate relation along the axial length of the drum. As such, adjacent bit tips may be positioned anywhere from about 0.200 inch to about ⅝ inch axially apart for either removing concrete, asphalt, or the like, when replacing one or both of the pavement and underlayment for roadways, or may be positioned axially closer together, about 0.200 inch, for micro milling the surface of pavement to remove buckles, create grooves on curved surfaces such as cloverleafs, or the like.

Improvements in the bits and bit/holders that are removably mounted on the bit blocks have increased the useful in-service life of those removable parts. While such bit and bit/holders have been made of steel and hardened materials such as tungsten carbide, the use of diamond coated tips and man-made PCD (polycrystalline diamond) tips, has been shown to increase the in-service life of those bits and bit/holders.

Another improvement in bit/holders has been the invention of quick change holders that have eliminated the necessity of securing such holders with threaded nuts or retaining clips and have utilized the compressive elastic ductility of hardened steel to provide sufficient radial force between the holders and the bit block bores to retain holders mounted in their respective bit block bores during operation. While such bit assemblies have included rotatable and removable bits mounted in bit holders which, in turn, were mounted in bit blocks as noted above, the introduction of diamond materials on bit tips has increased their in-service life 40 to 80 times and has, in some cases, allowed for the combining of bits and bit holders into a unitary construction with the tips no longer being rotatable on the holders.

A need has developed for improved structure at the front leading end or tip end of non-rotating bit/holders that provide for improved wear characteristics, in-service life and finer milled road surfaces at reduced total cost.

SUMMARY

This disclosure relates generally to bit and/or pick assemblies for road milling, mining, and trenching equipment. One implementation of the teachings herein is a bit tip insert that includes a body comprising a base and an overlay adjacent a forward end of the base; and an outer surface of the overlay comprising a tip, a plurality of parabolic sections adjacent the tip, and a generally cylindrical section adjacent the plurality of parabolic sections.

Another implementation of the teachings herein is a bit tip insert that includes a body comprising a base and an overlay adjacent a forward end of the base; and an outer surface of the overlay comprising a tip, a plurality of parabolic sections adjacent the tip, and an overfill portion extending outwardly of the widest portion of the body, the overfill portion adjacent the plurality of parabolic sections.

These and other aspects of the present disclosure are disclosed in the following detailed description of the embodiments, the appended claims and the accompanying figures.

BRIEF DESCRIPTION OF THE DRAWINGS

The features of the present disclosure which are believed to be novel are set forth with particularity in the appended claims. The disclosure may best be understood from the following detailed description of currently illustrated embodiments thereof taken in conjunction with the accompanying drawings wherein like numerals refer to like parts, and in which:

FIG. 4 is a photograph showing a front elevational view of a prior art bit/holder after substantial in-service use showing the wear characteristics on it after substantial use;

FIG. 5 is a photograph showing a side elevational view of the prior art bit/holder shown in FIG. 4 wherein separated material has flowed past the left side of the bit/holder in use;

FIG. 6 is an enlarged diagrammatic elevational detail view of a third embodiment of the enlarged tip insert;

FIG. 7 is a diagrammatic stop motion side view of the partial sweep of a bit assembly as it moves through its material separating operation;

FIG. 8 is a diagrammatic front view taken at 90 degrees to FIG. 7 showing the added side overlap of successive bit assemblies resulting in a finer finish cut using a drum with standard 0.625 inch center-to-center tip spacing;

FIG. 15 is a front elevation view of a prior art worn bit/holder;

FIG. 16 is a side elevation view of the prior art worn bit/holder;

FIG. 17 is a top elevation view of the prior art worn bit/holder;

FIG. 23 is a partial side perspective view of a prior art bit/holder in a base block, shown with a 0.540 inch diameter frustoconical diamond PCD tip insert of the prior art;

FIG. 24 is a partial side perspective view of a prior art bit/holder in a base block, shown with a 0.540 inch diameter conical diamond PCD tip insert of the prior art;

FIG. 25 is a partial side perspective view of the third embodiment of the bit/holder in a base block, shown with the fourth embodiment of the 0.750 inch diamond overlay PCD tip insert, in accordance with implementations of this disclosure;

FIG. 26 is a front elevation view of the fourth embodiment of the diamond overlay PCD tip insert, shown with the PCD diamond overlay attached to a forward end profile of a tungsten carbide base of the tip insert, in accordance with implementations of this disclosure;

FIG. 45 is a top elevation view of a fifth embodiment of a bit/holder, shown with the fifth embodiment of the tip insert, in accordance with implementations of this disclosure;

FIG. 46 is a side elevation view of the fifth embodiment of the bit/holder, shown with the fifth embodiment of the tip insert, in accordance to implementations of this disclosure;

FIG. 56 is an elevation view of the eighth embodiment of the tip insert, showing invisible internal elements in dotted lines, in accordance with implementations of this disclosure;

FIG. 57 is an elevation view of the eighth embodiment of the tip insert taken along line B-B of FIG. 56, showing the diamond layer in solid black and the substrate in hatching lines, in accordance with implementations of this disclosure;

DETAILED DESCRIPTION

The diameter of the base of the PCD ballistic insert is determined by the required geometric profile of the forward end of the point attack tool. As the machine or equipment size diminishes, so does the amount of horsepower of the engine needed to operate the machine.

The ballistic or parabolic style profile of the tip of the PCD insert provides a longer conic tip than a standard straight line side profile of a frustoconical tip. The longer parabolic tip has a greater PCD coated length with more structural strength. The included angle of the tip varies axially. Applicant's PCD tool is 180 degrees indexable to achieve extended life over prior art diamond coated tools, while maintaining nearly exactly the same cut surface profile.

Figure 1:
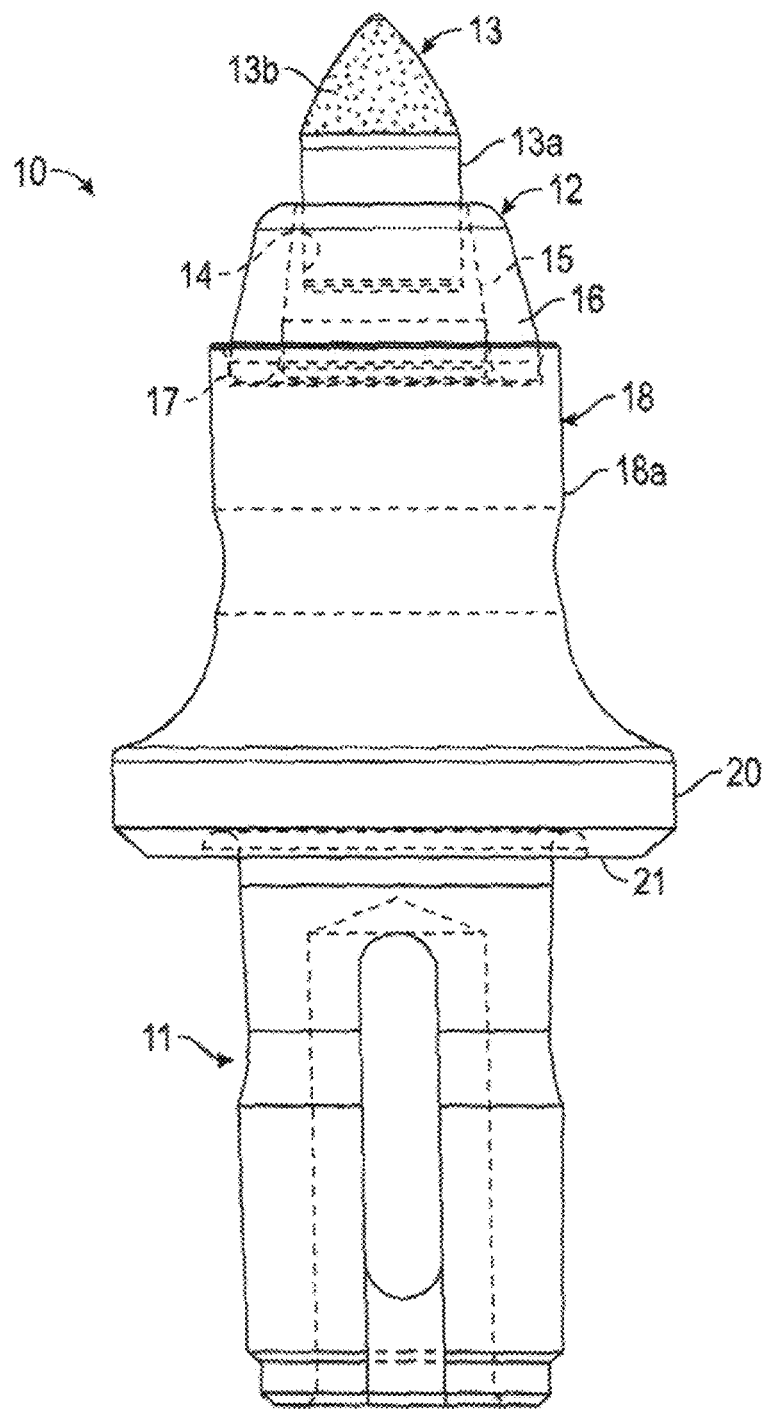
FIG. 1 is a front elevational view of a first embodiment of a bit/holder constructed in accordance with the present disclosure including a first embodiment of an improved and enlarged leading tip section.

Referring to FIGS. 1 and 2, a first embodiment of a bit/holder 10, constructed in accordance with the present disclosure, includes features from Applicant's previous U.S. Pat. Nos. 6,371,567, 6,585,326, and 6,739,327, which show both the shank 11 at the rear of the bit/holder and the forward end 12 of the bit/holder 10 having a diamond coated tungsten carbide tip insert 13 mounted in a generally cylindrical recess 14 at the center of an annular flange 15 extending axially outwardly from the steel body portion of the bit/holder. This steel annular flange 15 provides ductility and shock absorption characteristics to the generally ballistic shape tip 13 that is preferably made of tungsten carbide having either a single 13*b* or multiple layer (FIG. 6) of industrial diamond or PCD superstructure over the forward conical portion of the tip. Additionally, an annular ring 16 of tungsten carbide is mounted over the steel annular flange 15 for added wear resistance to the aft portion of holder. The tungsten carbide annular ring 16 is preferably brazed in an annular groove 17 at the top of the body portion 18 of the holder 10.

In the illustrated embodiment of the bit/holder 10 when used for road milling purposes, the nominal outer diameter of the shank 11 is about 1.5 inches and the nominal outer diameter of the widest portion of the body 18 of the holder is about 2⅝ inches at what is termed the "tire portion" 20 of the holder body 18. The diameter of the upper cylindrical portion 18a of the body 18 is about 1¾ inches and the axial length of the body from the rear annular flange 21 to the front of the cylindrical portion is about 3 inches. The length of the shank 11 in the embodiments shown approximates 2½ inches. As taught in Applicant's U.S. Provisional Patent Application No. 61/944,676, filed Feb. 26, 2014, now U.S. Non-provisional patent application Ser. No. 14/628,482, filed Feb. 23, 2015, and now U.S. Patent Application Publication No. 2015/0240634, published Aug. 27, 2015, the contents of which are incorporated by reference, bit holder shanks may be shorter, on the order of 1½ inches.

With the forward cylindrical end of a bit holder body 18 having a diameter of about 1¾ inches, prior art bits or pick bolsters have been designed to have a conical surface aiding in diverting pavement material away from the forward tip portion of the bit/holder or bit.

In designing these structures, tip inserts having a front conical tip of PCD or diamond layered material 13b, as shown in FIG. 1, have been selected to provide best results. The diameter of the tip insert at its widest point for holders sized as above has thus far been a tip insert made to a base diameter of about 0.565 inch. In experimenting with such diamond covered tip insert structures, Applicant has discovered that using such a tip having a nominal diameter of 0.625, 0.75, 0.875 inch or larger ballistic tip insert may still be inserted in a modified structure substantially similar to that previously shown in U.S. Pat. No. 6,739,327. Thus, the improvement is also compatible with existing drums and bit holder blocks. This illustrated ⅝ inch or larger diameter ballistic shaped tip insert 40 is also longer (FIG. 6) in overall length than the 0.565 inch diameter prior insert utilized.

The overall length of the ¾ inch diameter ballistic tip insert is about 1⅛ inches. This length when mounted in the cylindrical recess 14, having a diameter of at least 0.625 inch, at the front of the bit holder body 18 allows the ballistic tip insert 13 to extend at least ⅝ inch from the front of the annular tungsten carbide collar 16 and to extend at least ½ inch outwardly of recess 14. When coating tungsten carbide inserts with diamond, high temperature, high pressure presses are used. Making more 0.565 diameter inserts has thus far yielded slightly cheaper inserts, but Applicant has found that making fewer, larger inserts per manufacturing operation at cycle yields better milling results, although each insert is made at a slightly higher cost. Referring to FIGS. 4 and 5, the wear pattern of a prior art PCD insert tip 25 attached to a tungsten carbide bolster bit/holder 26 of the prior art 0.565 inch tip diameter is shown. The conical portion of the ballistic tip insert 25 shows some wear after substantial use of the tool. Most of the wear occurs immediately aft 27 of the widest part 28 of the tip insert. This wear occurs in the product shown on both sides in FIG. 4 and on the left (loosened material flow side in FIG. 5) in what is termed a "tungsten carbide bolster" 26 that initially is generally frustoconical in shape with a slightly convex worn outer surface. The right side of the tip 25 in FIG. 5 slides along the remaining roadway material. As shown in FIGS. 4 and 5, this PCD conical front tip 25 extends minimally away from the front of the tungsten carbide bolster 26. It is submitted that the additional ⅝ inch extension of the improved ⅝ inch or larger diameter ballistic tip insert of the present disclosure urges removed asphalt and concrete material away from the tip 13 at the area of most wear (the left side of FIG. 5 in the prior art) and thus provides reduced wear on the annular ring.

Figure 2A:
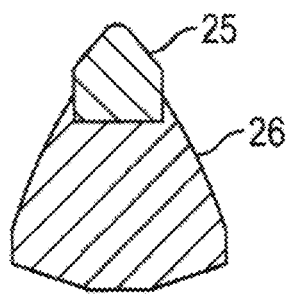
FIG. 2a is a cross section view of a prior art 0.565 inch PCD tip insert mounted on a recess in a pick bolster.
Figure 2B:
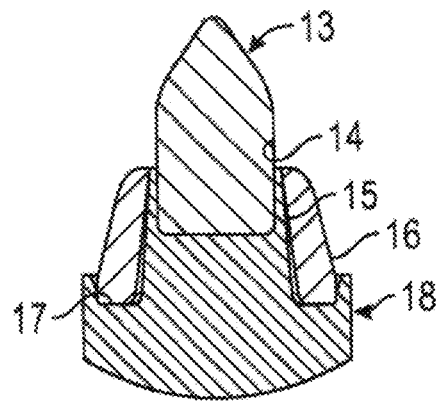
FIG. 2b is a fragmentary cross section view of the 0.75 inch diameter PCD layered tip insert as in FIG. 1 shown for comparison purposes with the prior art disclosed on the other FIG. 2 drawings.

Referring to FIGS. 2a, 2b, 2c and 2d, the bit tip insert 13 of the disclosure shown in FIG. 2b is compared with a prior art 0.565 inch diameter conical tip shown in FIG. 2a. The added diamond coated conical area of the new tip 13 of FIG. 2b, shown in FIG. 2c solid line 13 at the sides of the prior art tip of FIG. 2a at 25, provides substantially greater diamond protected cutting area than the prior art. This added area, when used on neighboring like sized tips, on ⅝ inch center-to-center drums, provides substantial cutting overlap on pavement to be milled.

Figure 2C:
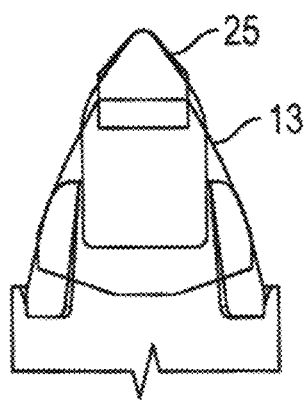
FIG. 2c is a diagram view showing the prior art tip of FIG. 2a superimposed on the front portion of the enlarged tip of FIG. 2b.
Figure 2D:
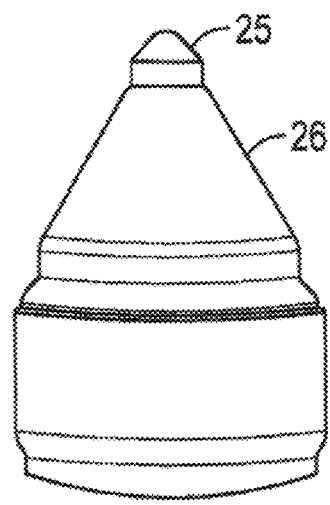
FIG. 2d is a fragmentary photograph of another prior art tip having a 0.565 inch diameter conical distal end.

FIGS. 2a and 2d show prior art 0.540 to 0.565 inch PCD inserts 25 which have conical PCD tips brazed to tungsten carbide bases mounted on a pick bolster 26 made of tungsten carbide.

FIG. 2c shows the outlines of tip insert 13 of the present disclosure as mounted in a bit holder with the prior art 0.565 tip and bolster of FIG. 2a superimposed at 25 thereon. As in FIG. 2b, the added (enlarged) diamond coated conical portion over this piece of prior art can readily be seen with similar advantages as discussed above. The profiles toward the top of the bit insert are similar, but the height of the tapered portion is greater than a 0.565 inch PCD tip producing better wear protection to the annular carbide ring as will be discussed below.

FIG. 2d shows another prior art 0.565 diamond tip insert 25. Applicant's 0.75 inch conical tip insert would provide similar advantages over this tip as mentioned in connection with FIG. 2c above.

Figure 3:
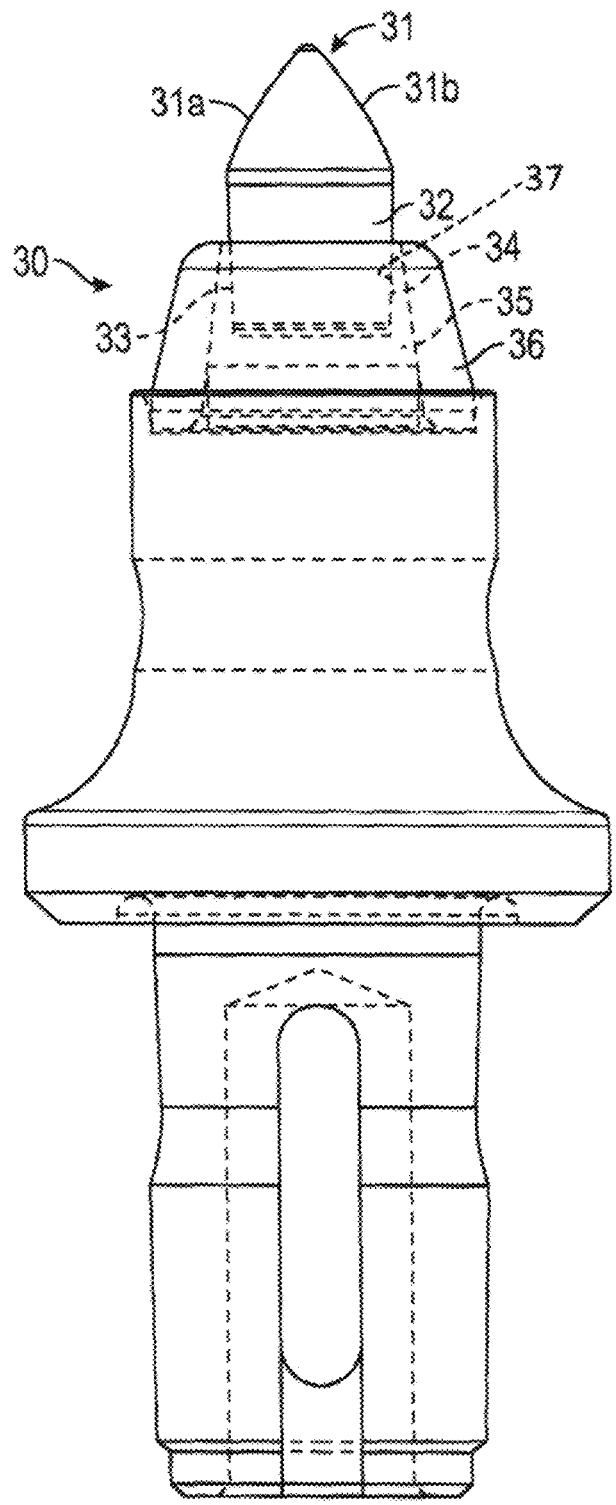
FIG. 3 is a front elevational view of a second embodiment of a bit/holder constructed in accordance with the disclosure showing a second embodiment of a tip having a slight reverse taper in the aft or body portion thereof which is mounted on the front of the holder portion thereof.
Figure 9:
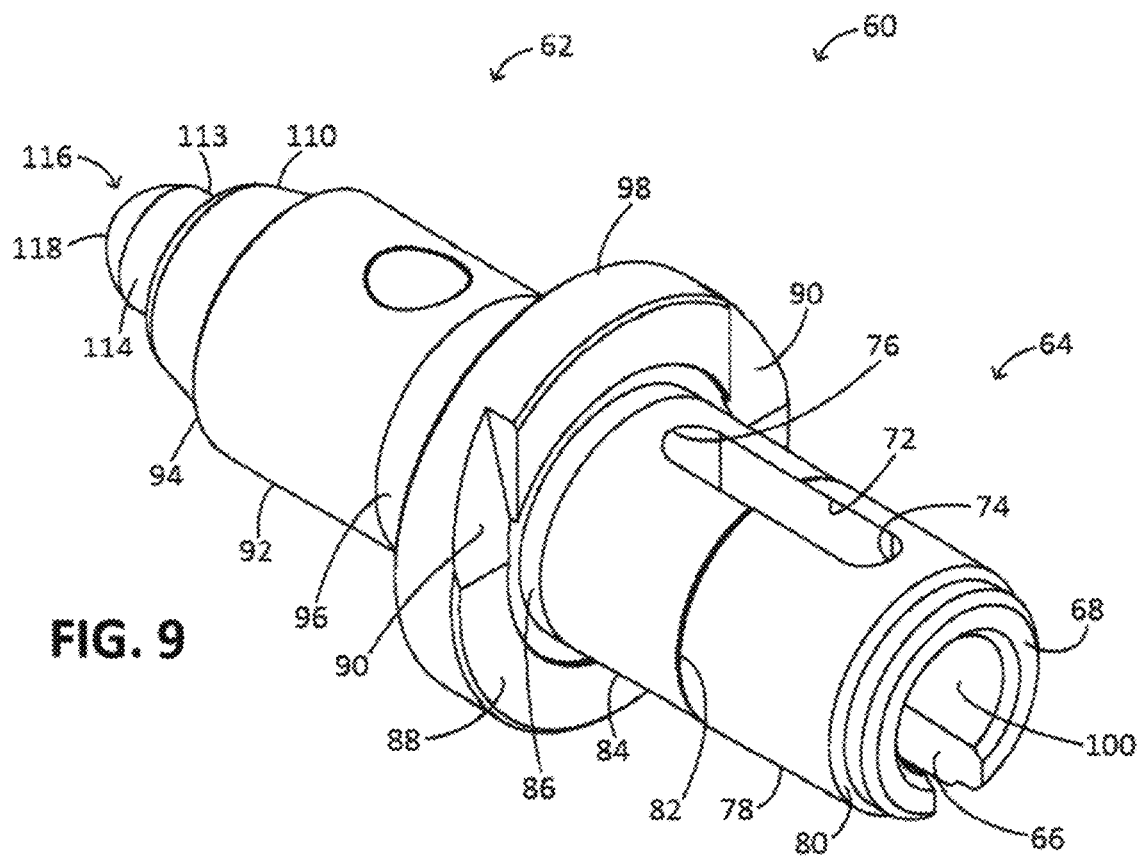
FIG. 9 is a rear perspective view of a third embodiment of a bit/holder and a fourth embodiment of a tip insert in accordance with implementations of this disclosure.
Figure 10:
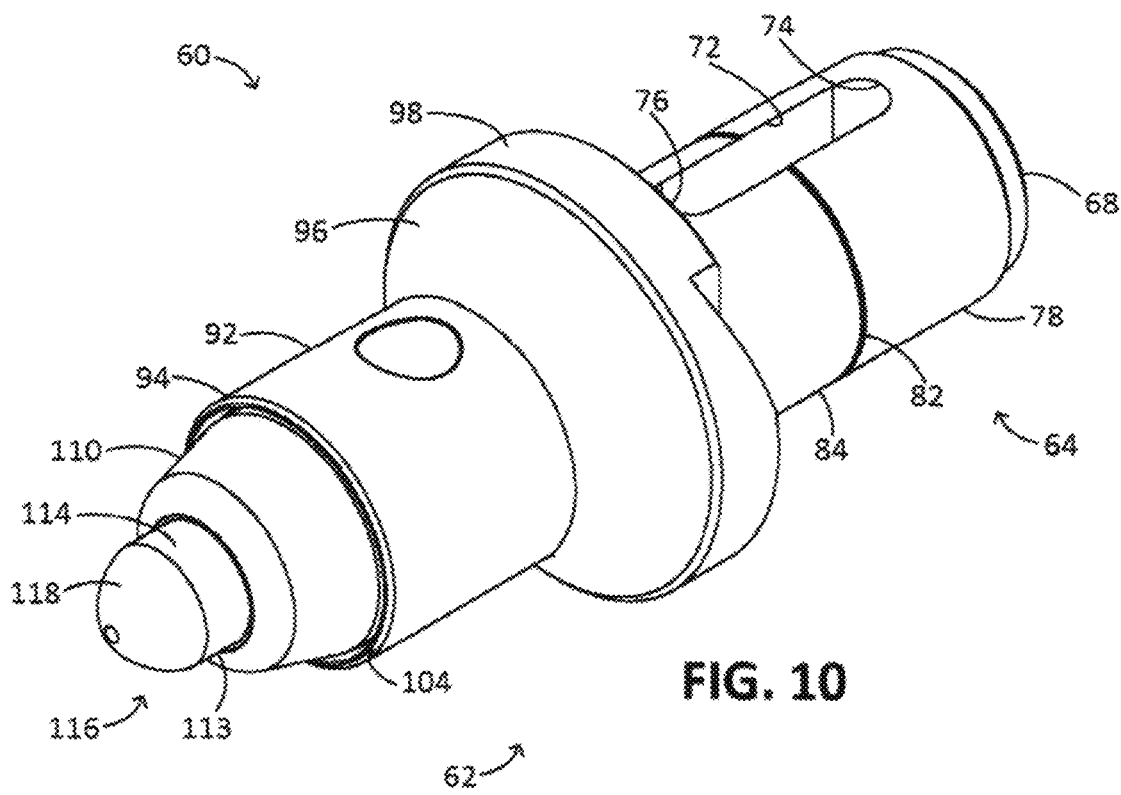
FIG. 10 is a front perspective view of the third embodiment of the bit/holder and the fourth embodiment of the tip insert in accordance with implementations of this disclosure.
Figure 11:
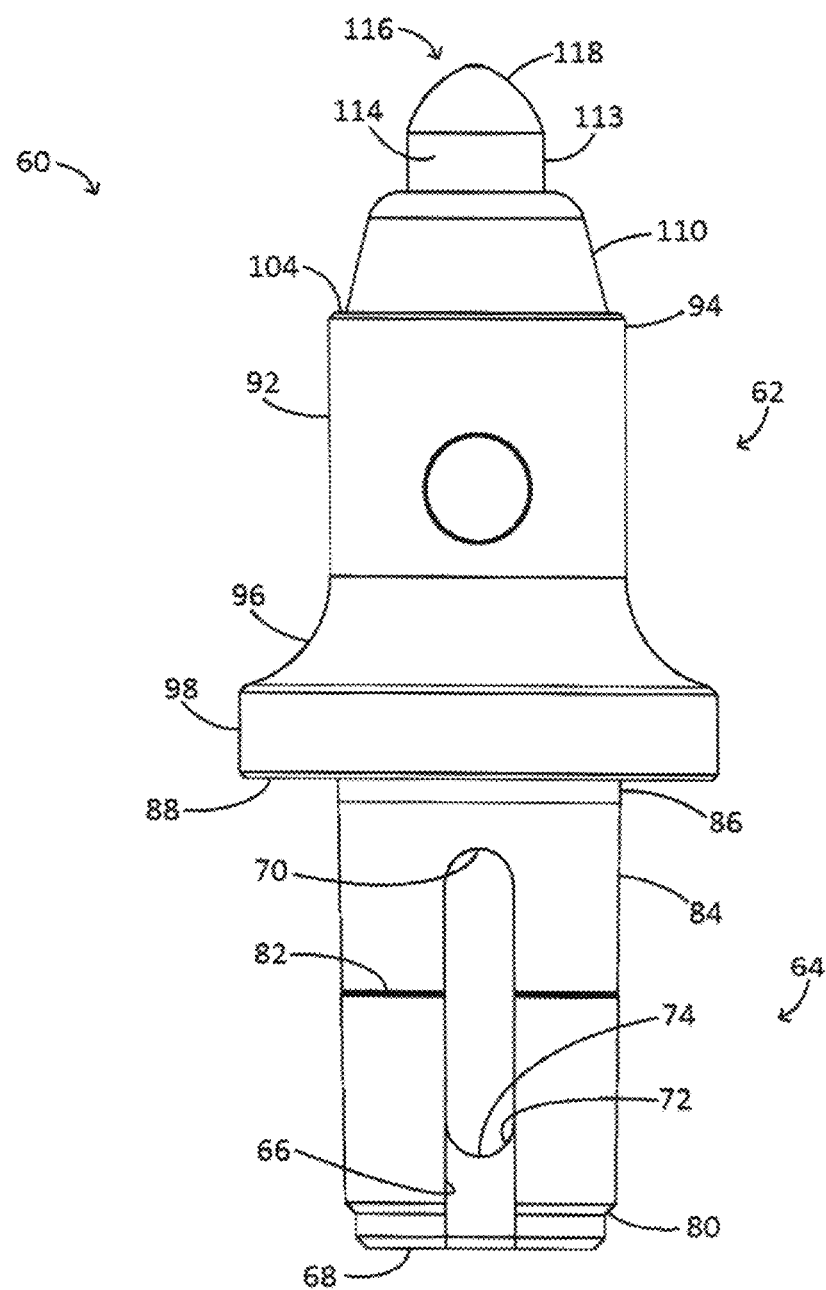
FIG. 11 is an elevation view of the third embodiment of the bit/holder and the fourth embodiment of the tip insert in accordance with implementations of this disclosure.
Figure 12:
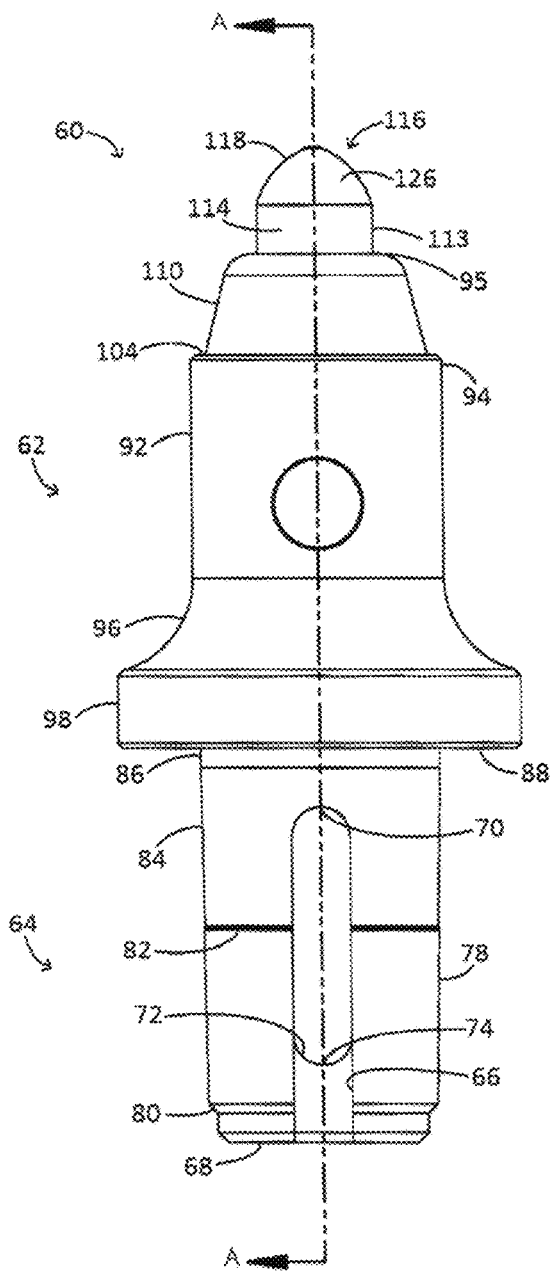
FIG. 12 is a front elevation view of the third embodiment of the bit/holder and the fourth embodiment of the tip insert in accordance with implementations of this disclosure.
Figure 13:
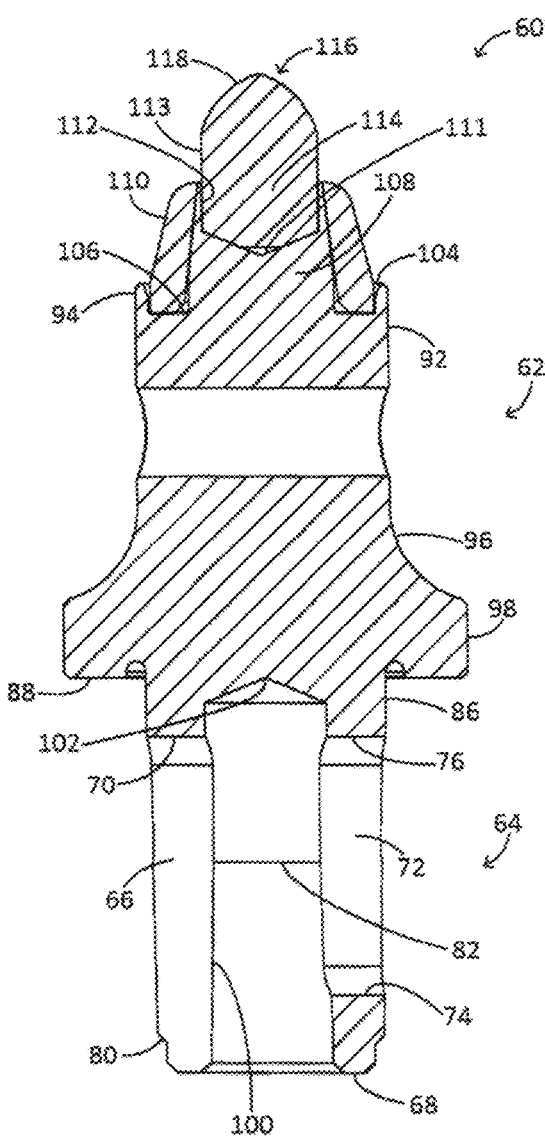
FIG. 13 is a cross-sectional view of the third embodiment of the bit/holder and the fourth embodiment of the tip insert, taken along line A-A of FIG. 12, in accordance with implementations of this disclosure.
Figure 14:
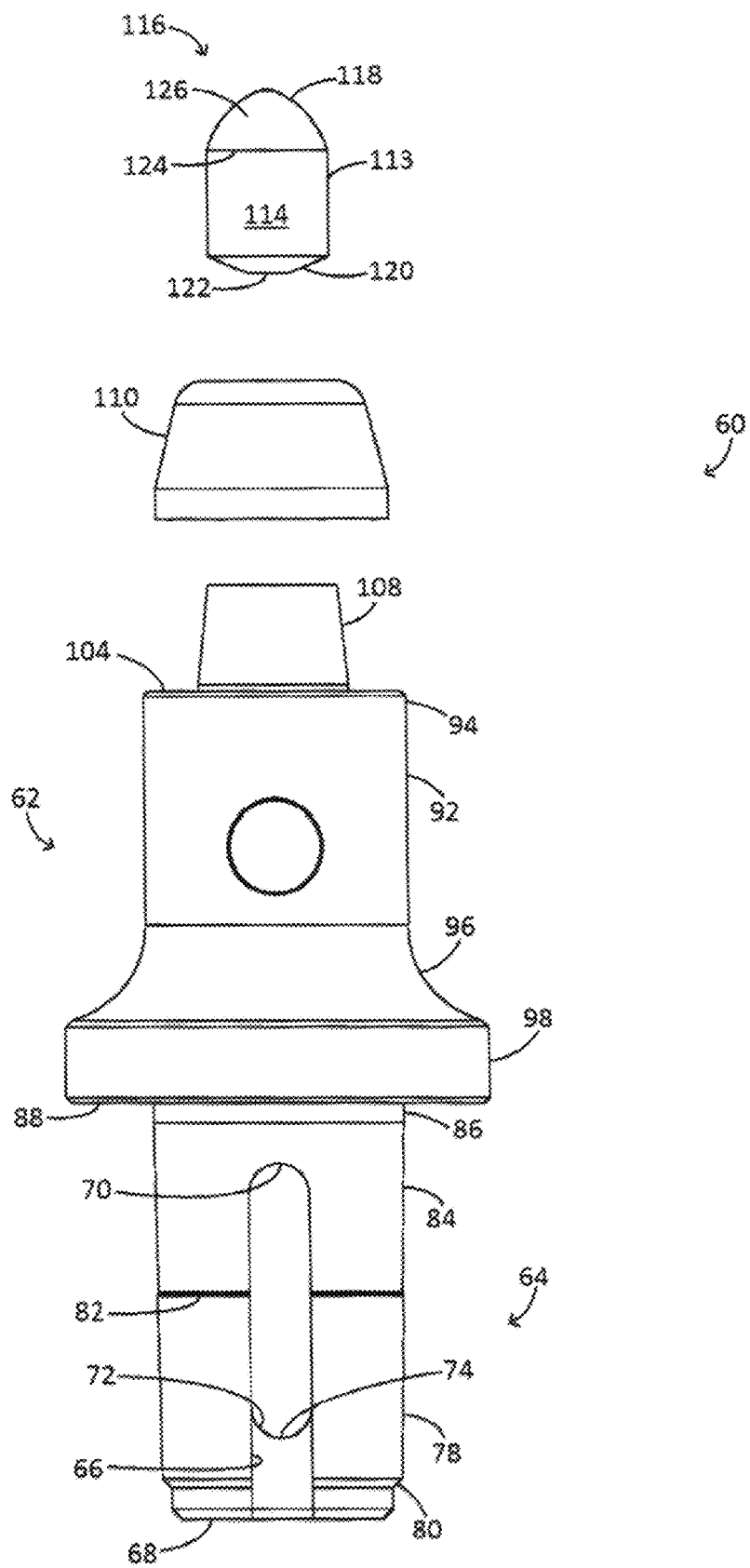
FIG. 14 is an exploded elevation view of the third embodiment of the bit/holder and the fourth embodiment of the tip insert in accordance with implementations of this disclosure.
Figure 18:
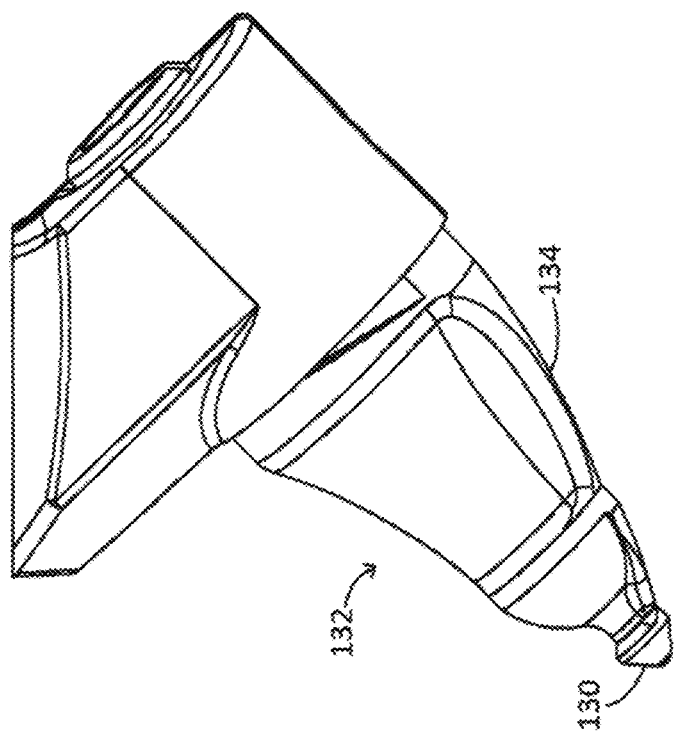
FIG. 18 is a side perspective view of the prior art worn bit/holder shown in a base block.

FIG. 3 shows a second embodiment of a bit/holder 30 of the present disclosure utilizing a 0.75 inch nominal diameter diamond covered conical tip 31 with a tungsten carbide base 32 that is slightly reverse tapered at its sides 33, 34 at approximately a 2 degree half angle in this illustrated embodiment, that is, 2 degrees per side. In other embodiments, the tungsten carbide base 32 is slightly reverse tapered at its sides 33, 34 in the range of and including ¹⁄₁₀₀ of 1 degree to 15 degrees per side).

While prior art bits and bit/holders disclose an enlarged tungsten carbide conical portion just aft of the 0.565 inch base insert with PCD shaped tip, the present disclosure, having a steel annular tubular column 35 having a recess 37 (FIG. 3) into which the 0.75 diameter PCD insert 31 is inserted, provides additional shock absorbing characteristics as a result of the ductility of the steel and subjacent braze joint. Prior art PCD tungsten carbide inserts brazed to tungsten carbide bases do not possess those shock absorbing capabilities. The central steel annular tubular column 35 also provides for greater thermal expansion and contraction during use. As the forward end of the PCD insert 31 increases its working temperature, the steel column 35 and the braze joint will expand about twice the amount of tungsten carbide expansion for the same increase in temperature and radially grab the PCD insert 31 more securely. The carbide collar 36 restricts the steel column 35 from similarly expanding outwardly. The steel tubular column 35 has about twice the coefficient rate of thermal expansion value as tungsten carbide.

Thus, improved bit/holders 10, 30, utilizing a ballistic shape tip of an increased diameter from 0.565 inch to 0.75 inch and larger provides a superior product than previously known in the art while still being usable with present size bit holder blocks (not shown).

Referring to FIG. 6, a third embodiment of a ballistic shaped diamond coated tungsten carbide insert 40 is shown. A tip such as shown in the first embodiment could include a frustoconical tip having an approximately ⅛ inch curved radius at the top 41 thereof, and straight or parabolic conical sides leading down to the widest part of the base 44. Also, the tip 13 shown in the first embodiment has a cylindrical base 13a that extends at least about ¾ inch behind the generally conical tip 13, which fits into the cylindrical recess 14 at the top of the body 18 of the holder 10 in the first embodiment and is brazed into recess 14.

In the second embodiment of the bit/holder 30, the tip 31, shown in FIG. 3, and the third embodiment of the tip 40, shown in FIG. 6 also include an approximate ⅛ inch curved top. The sides 31a, 31b (FIG. 3) of the conical portion of the insert are parabolic in shape. An additional ⅛ inch thereafter, the parabola shape changes to a 60½ degree separation and another ⅛ inch down from there the separation changes to an approximate 51 degree separation.

The parabolic shape of the ballistic tip 31 provides more mass under the multi layered diamond coating than would a straight side conical tip. Additionally, the top of the parabolic tip 31 provides improved separation of the material removed from the base thereof and directs the material removed further away from the base of the tip.

As shown, the base 32 of the tip 31 in the second embodiment is ¾ inch in diameter and in the second embodiment includes a 2 degree per side taper toward the bottom of the insert which is about a total 1 inch to 1.5 inches in height.

As mentioned previously, it appears from the drawing shown in FIG. 3, that an important factor for wear in the bit/holder is the width of the base of the tip insert. While prior art inserts have been approximately 0.565 inch in diameter, increasing that diameter to 0.75 inch and larger provides a wider base at the point of greatest wear during use of such a bit/insert. Thus the use of a 0.75 inch or greater diameter insert base provides for greater longevity of use. Also, larger bit holders are utilized for trenching and mining operations, so larger bit inserts can be utilized there. Further, the increased length of the insert to 1 inch in length or greater allows at least a ⅝ inch exposed length of the insert that also directs material removed away from the base of the insert to decrease the wear in what FIGS. 4 and 5 show as the most sensitive part of the wear for a bit/holder during use.

The third embodiment of the diamond coated tip 40 shown in FIG. 6 differs from that shown in FIG. 3 in that the diamond coating 46 includes a ridge or overfill portion 44 at the base of the parabolic curves 42, 43 that has a thickness of about 0.010 inch or more per side. The overfill or over formed portion 44 may not be regular in shape and does not need to be ground or removed into any specific shape. This added diameter also affects the shape of the finished surface as will be discussed in more detail below. Depending upon the grade of diamond material or PCD material used, this thickness of the diamond coating may typically be about 0.120 inch or less. Multiple layers of diamond coating 46, 47, as shown in FIG. 6, may be overlayed on the bit tip 40. It should be noted that with the greater diameter and outward extending diamond edge overfill 44 of the increased tip 40 shown in FIG. 6, a thinner diamond or PCD coating at 46, 47 may be utilized in adjusting wear characteristics vs. cost. It should be noted that the conical area of a 0.75 inch diameter cone at the tip includes over 3.5 times the area of a 0.565 inch tip, providing a substantially more massive cutting tool.

Referring to FIGS. 7 and 8, a plurality of cutting tools 50-50, constructed in accordance with the present disclosure, are shown sweeping across the cutting area of a surface to be removed. As previously described, the increased outer diameter of the bit tip to 0.75 inch adds mass to the exact area where most wear during use occurs. This increased cross section creates a shallow depth pattern as needed in micro milling, without requiring additional machine horsepower.

As previously discussed, a plurality of these bit assemblies 50-50 are mounted on cylindrical drum 51 in spiral or chevron fashion. A typical drum being about 7 feet to about 13 feet in length and typically 42 to 54 inches in diameter, may hold around 168 to 650 bit assemblies with center-to-center axial spacing of 0.625 inch between bit assemblies. This is in what is termed a "standard drum" previously used for removal of not only surface material, but also substrate material. Previously, drums used for micro milling have had center-to-center tip axial spacing of 0.20 inch between tips. As such, drums used for micro milling may have about 325 bit assemblies for same 7 feet 2 inch length drum. This is in drums term "double or triple hit drums," double hit drums may have about 25 percent more of the bit assemblies. Full lane micro milling drums that are about 13 feet in length may have 600 to 900 bit assemblies per drum at a 0.200 inch center-to-center axial tip spacing.

Applicant has found that the use of ¾ inch nominal diameter or larger diamond coated bit tips when used at ½ to 1 inch depth of cut at approximately 92 rpm drum rotation speed and at a travelling speed of 20-40 ft/min may provide a surface approaching or equal to the flatness of a micro milled surface previously obtained with 0.565 inch diameter bit tips on drums having 0.200 inch center-to-center bit separation with same machine cutting specifications.

FIG. 8 shows a diagram of succeeding 0.75 inch bit tips of the present disclosure spaced at 0.625 inch apart which gives an axial overlap between adjacent bit tips of about 0.125 inch. This overlap is also at the point of most vertical curvature for even a ½ inch depth of the cut, leaving a substantially flatter surface than would be obtained using the 0.565 inch diameter bit tips. The fineness of the residual surface is also obtained by moving the drum at a slower speed (15-25 fpm). The faster in feet per minute the drum travels forward, the rougher the cut. It is therefore necessary not to outrun the cut. A speed of 60-120 feet per minute is considered normal for a rough cut.

As noted, the resulting fineness of the surface milled using the larger diameter bit tip approaches or achieves micro milling flatness by utilizing standard center-to-center diameter drums instead of the more expensive drums presently made for micro milling operations. Additional fineness of cut can be achieved by modifying spacing to somewhat less than 0.625, but substantially greater than 0.2 inch center-to-center. Not only is the cost of the drum less, but utilizing fewer bit assemblies makes a lighter drum requiring less horsepower to operate with more fuel efficiency and less impact on the machine components.

Referring to FIGS. 9-14, a fourth embodiment of a generally conical tip insert 116, that includes a parabolic curved section below an apex of the tip 116, in a third embodiment of a bit/holder 60 of the present disclosure is shown. The bit/holder 60 is a unitary bit and bit holder construction that includes a body 62 and a generally cylindrical hollow shank 64 axially depending from a bottom of the body 62. The shank 64 includes an elongate first slot 66 extending from a generally annular distal end 68 of the shank 64 axially upward or forward to an upper termination 70 adjacent the upper or forward end of the shank 64. In this embodiment, the shank 64 also includes an internally oriented second slot 72 located approximately 180 degrees around the annular shank 64 from the first slot 66. This second slot 72 is parallel to the first slot 66 and is an internal slot having a rearward semicircular termination 74 inwardly adjacent to the distal end 68 of the shank 64 and a forward semicircular termination 76 generally coinciding longitudinally and axially with the upper termination 70 of the first slot 66.

In this illustrated embodiment, the shank 64 preferably includes a lower or first tapered portion 78 running axially from a stepped shoulder 80 adjacent the distal end 68 of the shank 64. The stepped shoulder 80 is disposed between the lower tapered portion 78 and the distal end 68. A diameter of the stepped shoulder 80 increases, or steps up, as it axially extends from the distal portion 68 to the lower tapered portion 78. The first tapered portion 78 runs upwardly or axially from the stepped shoulder 80 of the shank 64 and terminates generally mid slot 66 longitudinally. The shank 64 also includes an annular shoulder 82 separating the lower tapered portion 78 from an upper or second tapered portion 84 which extends from the shoulder 82 generally adjacent to the top of the shank 64 or forward terminations 70, 76 of slots 66, 72, respectively. The annular shoulder 82 is disposed between the lower tapered portion 78 and the upper tapered portion 84. A diameter of the annular shoulder 82 decreases, or steps down, as it axially extends from the lower tapered portion 78 to the upper tapered portion 84. A generally cylindrical top portion 86 of the shank 64 extends from a position adjacent the top or upper terminations 70, 76 of slots 66, 72, respectively, towards a generally annular back flange 88 that denotes the base or bottom of the body 62 of the bit/holder 60.

The generally annular flange 88 includes a pair of horizontal slots 90-90 generally perpendicular to the longitudinal axis of the combination bit/bit holder, one on either side of the generally annular flange 88. The horizontal slots 90-90 are configured to receive a pair of bifurcated fork tines that may be inserted between the base of the body 62 of the bit/holder 60 and a base block (not shown) into which the shank 64 of the bit/holder combination is inserted and retained by outward radial force in use.

In this third illustrated embodiment of the bit/holder 60, the bit holder body 62 includes an generally cylindrical or annular upper body portion 92 depending from a forward end 94 of the body 62. A mediate body portion 96 subjacent the upper body portion 92 generally slopes axially and radially outwardly to a radially extending generally cylindrical tire portion 98.

A central bore 100 longitudinally and axially extending through the shank 64 of the bit holder body 62 of the bit/holder 60 combination terminates at bore termination 102 (FIG. 13), which in this illustrated embodiment has a conical shape, that is approximately at the upper end of the shank 64. This allows the generally C-shaped annular side wall of the shank 64 to radially contract when the shank 64 is mounted in one of a tapered and/or cylindrical bore in a base block (not shown).

The bit holder body 62, shown in FIGS. 11-14, in order to provide superior brazing of a tungsten carbide ring 110 to the forward end 94 of the bit/holder 60, includes a forwardly extending annular collar 104 that is created on the bit holder body 62 to provide an annular trough 106 around a tapered forward extension 108 of the bit holder body 62 onto which the annular ring 110 is mounted. The vertical outer wall of the trough 106 will keep brazing material from flowing outwardly of the joinder between the base of the ring 110 and the annular collar 104. The annular trough 106, on which the ring 110 is positioned, is therearound positioned perpendicular to the axis of the bit/holder 60 from the interior of which axially extends the smaller radially oriented annular tapered upper or forward extension 108. Around this tapered forward extension 108 is fitted the annular tungsten carbide ring 110, seated in the annular trough 106, which may preferably be brazed into unitary construction with the remainder of the bit/holder 60. The top or forwardmost portion of the tungsten carbide ring 110 and the annular tapered forward extension 108 of the upper body portion 92 terminate generally at an end 95 (FIG. 12) of the bit holder body 62 of the combination bit/holder 60.

With the bit holder body 62 of the present disclosure preferably made of 4340 or equivalent steel, the top of the forward extension 108 of the upper body portion 92 includes a generally cylindrical bore 112, or a radially declining tapered bore 115 in other embodiments, extending from the co-terminal upper wall of the body axially inwardly thereof which defines, in this illustrated embodiment, a hollow generally cylindrical shape. In other embodiments, the bore can also have a radially declining taper or a slight draw or draft angle. The bore 112 extends a short distance longitudinally axially inwardly of the end 95 of the forward extension 108 to define a base 111 for the tip insert base 114. The base 111, in this illustrated embodiment, has a conical shape.

The generally cylindrical bore 112 provides a space for receiving a complementary shaped positive generally cylindrical or declining tapered outer surface 113 of a base 114 of the tip insert 116 for the bit/holder combination. In one exemplary implementation of the fourth embodiment, the tip insert 116 can have a diameter in the range of ⅝ inch to 1.250 inch. In this fourth embodiment, the base 114 includes a frustoconical portion 120 adjacent a distal end 122 of the base 114. The base 114 may be made of steel or tungsten carbide and includes a tip 118 at an outer or forward end 124 of the base 114. In this embodiment, an outer surface or forward end 126 of tip 118 has an overlay 127 of a polycrystalline diamond structure. The tip 118 can have a frustoconical shape, a flat generally cylindrical puck shape, a parabolic ballistic shape, and/or an arcuate shape. The outer surface 126 of the tip 118 may also include an overlay 127 of an industrial diamond material and may be a single coating or outer layer or multiple coating or outer layers of such industrial diamond material, natural diamond, polycrystalline diamond (PCD) material, and polycrystalline diamond composite or compact (PDC) material. The single or multiple coatings or layers may be formed by a high pressure, high temperature process. The overlay 127 occupies a large radial and axial profile of the tip 118 which allows faster heat transfer into a region subjacent to the overlay 127 PCD layer. Excessively high heat, such as temperatures above 1300 degrees F., is the greatest cause of PCD failure due to diamond connective failure, the quick heat transfer from the tip 118 of the PCD cutting zone, which is approximately ½ inch depth of cut per tip engagement, to the subjacent region below the PCD drastically reduces the possibility of a temperature of the tip 118 of the PCD reaching temperatures at or above 1300 degrees F. for any extended period of time thereby avoiding failure of the PCD layer.

Referring to FIGS. 15-18, a worn prior art design of a 0.540 inch tip insert 130 in a bit/holder 132 is shown. The tip insert 130 and the forward body portion 134 of the bit/holder 132 are worn around a substantial circumference, almost 360 degrees as shown by FIGS. 15-18, of the tip insert 130 and the forward body portion 134 of the bit/holder 132.

Figure 19:
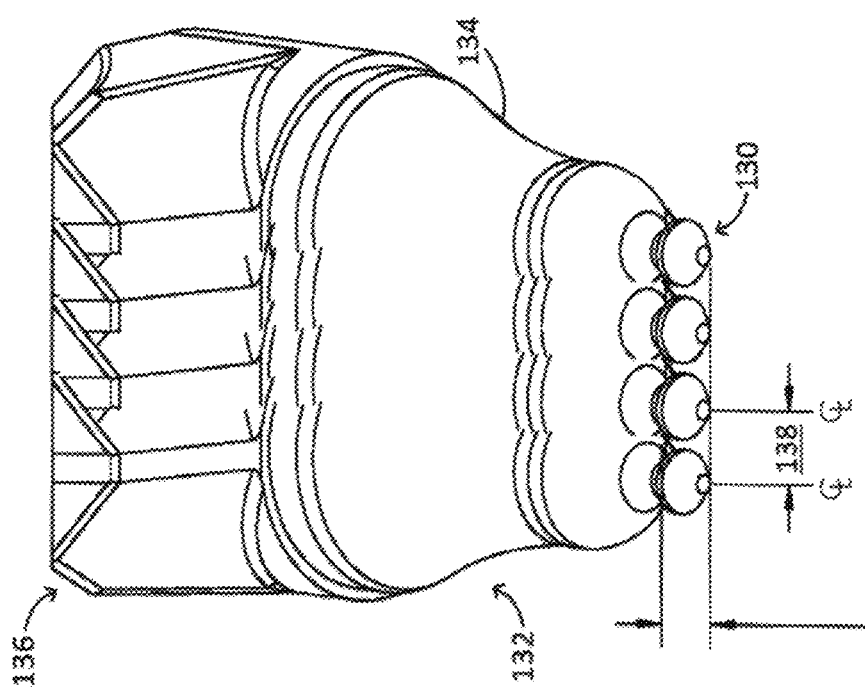
FIG. 19 is a diagram of a plurality of prior art bit/holders in base blocks, each showing a tip insert of the prior art at a 0.40 inch depth of cavity without a diameter overlap zone and a 0.63 inch distance between the centerline of each tip insert to the centerline of the next tip insert.
Figure 20:
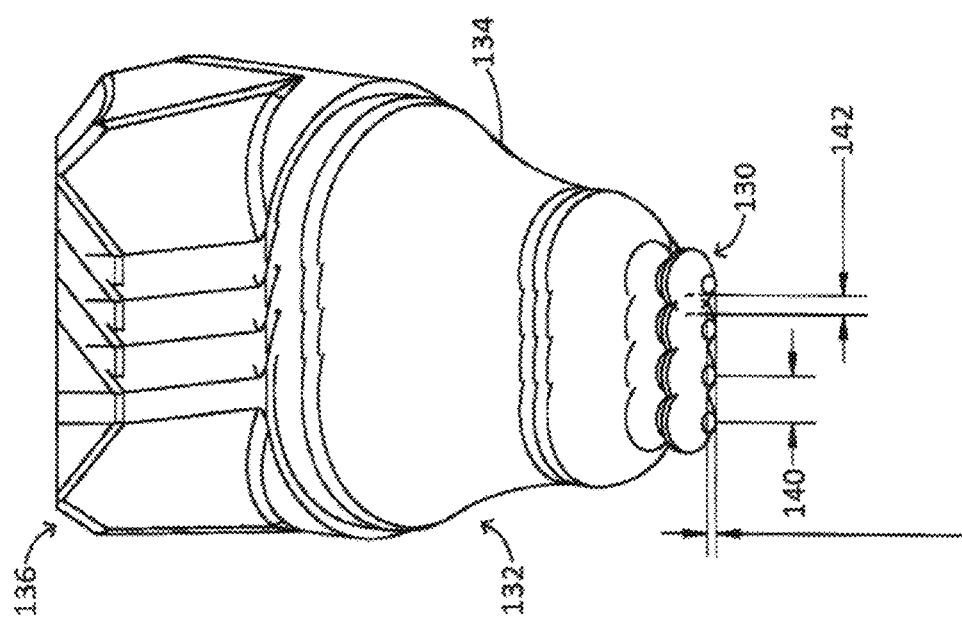
FIG. 20 is a diagram of a plurality of prior art bit/holders in base blocks, each showing a tip insert of the prior art at a 0.07 inch depth of cavity with a diameter overlap of 0.162 inch and a 0.375 inch distance between the centerline of each tip insert to the centerline of the next tip insert.
Figure 21:
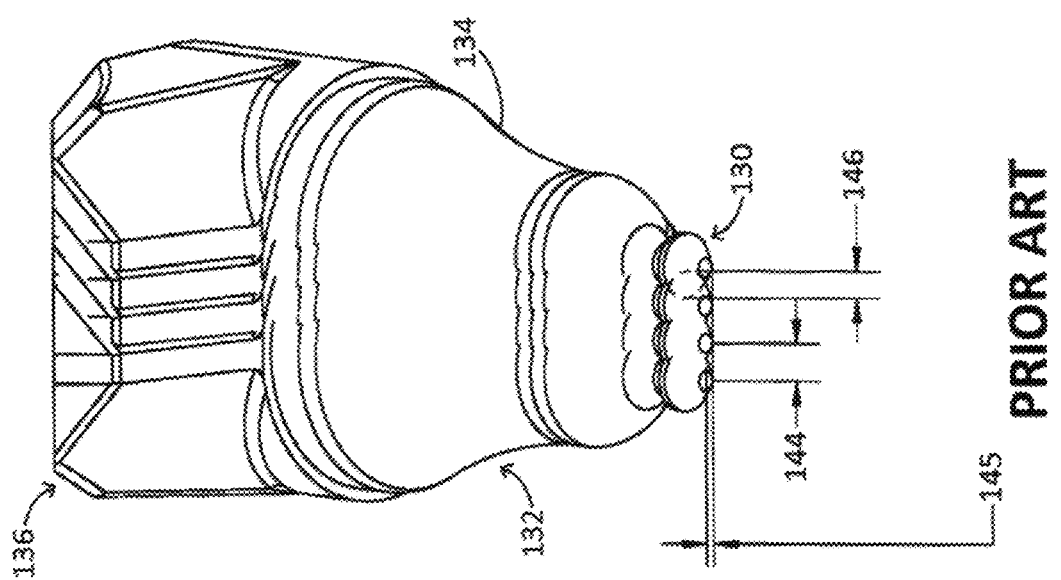
FIG. 21 is a diagram of a plurality of prior art bit/holders in base blocks, each showing a tip insert of the prior art at a 0.05 inch depth of cavity with a diameter overlap of 0.224 inch and a 0.3125 inch distance between the centerline of each tip insert to the centerline of the next tip insert.
Figure 22:
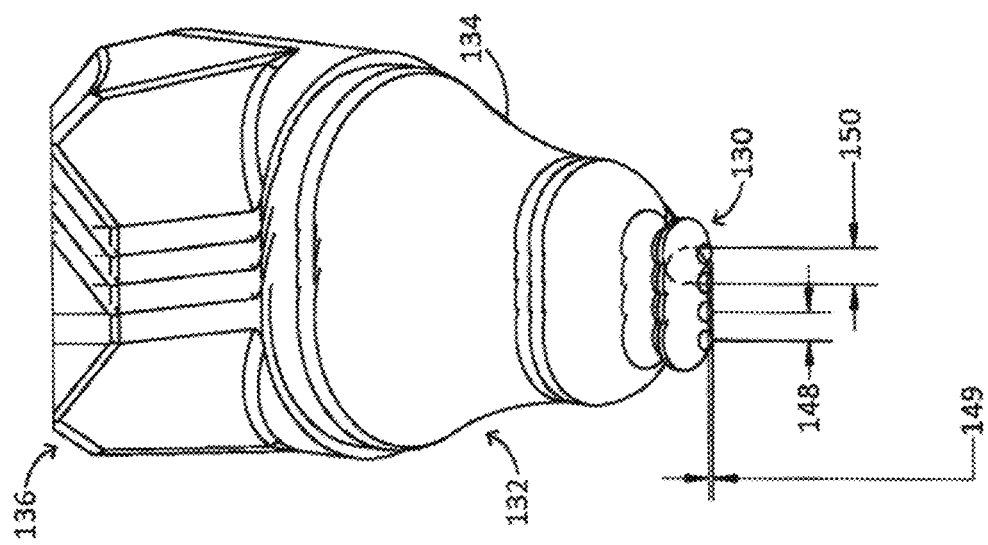
FIG. 22 is a diagram of a plurality of prior art bit/holders in base blocks, each showing a tip insert of the prior art at a 0.04 inch depth of cavity with a diameter overlap of 0.298 inch and a 0.236 inch distance between the centerline of each tip insert to the centerline of the next tip insert.

Referring to FIGS. 19-22, several prior art design 0.540 inch tip inserts 130 in corresponding bit/holders 132 mounted in a base blocks 136 are shown in various configurations. FIG. 19 is a diagram of the tip inserts 130, bit/holders 132, and base blocks 136 shown in a first configuration, where a distance 138 from a centerline of one tip insert 130 to a centerline of an adjacent tip insert 130 is 0.63 inch at a 0.40 inch depth of cavity 139 when there is no diameter overlap zone between adjacent tip inserts 130. FIG. 20 is a diagram of the tip inserts 130, bit/holders 132, and base blocks 136 shown in a second configuration, where a distance 140 from a centerline of one tip insert 130 to a centerline of an adjacent tip insert 130 is 0.375 inch at a 0.07 inch depth of cavity 141 when there is a diameter overlap zone 142 of about 0.082 inch between adjacent tip inserts 130. FIG. 21 is a diagram of the tip inserts 130, bit/holders 132, and base blocks 136 shown in a third configuration, where a distance 144 from a centerline of one tip insert 130 to a centerline of an adjacent tip insert 130 is 0.3125 inch at a 0.05 inch depth of cavity 145 when there is a diameter overlap zone 146 of about 0.114 inch between adjacent tip inserts 130. FIG. 22 is a diagram of the tip inserts 130, bit/holders 132, and base blocks 136 shown in a fourth configuration, where a distance 148 from a centerline of one tip insert 130 to a centerline of an adjacent tip insert 130 is 0.236 inch at a 0.04 inch depth of cavity 149 when there is a diameter overlap zone 150 of about 0.152 inch between adjacent tip inserts 130. As the bit assemblies are mounted closer together for finer road milling and/or micro milling, the diameter overlap zone between adjacent tip inserts 130 must be increased in order to have the centerline of one tip insert 130 aligned to the centerline of an adjacent tip insert 130.

FIGS. 23 and 24 show two prior art tip insert 130 designs in the bit/holder 132 and the base block 136 and the fourth embodiment of the tip insert 116 of the present disclosure in the bit/holder 60 and the base block 128. FIG. 23 shows a 0.540 inch diameter frustoconical diamond PDC tip insert 130 of the prior art in a worn bit/holder 132. FIG. 24 shows a 0.540 inch diameter frustoconical PDC tip insert 130 of the prior art in a new bit/holder 132. FIG. 25 shows the fourth embodiment of the tip insert 116 of the present disclosure in a new bit/holder 60, which in this illustrated embodiment includes a ¾ inch diameter generally frustoconical diamond overlay tip insert 116. The ¾ inch diameter generally frustoconical diamond overlay tip insert 116 is shown in detail in FIG. 26, showing the PCD diamond overlay attached to the outer surface 126 of the tip 118, which is attached to the forward end 124 of base 114.

Figure 27:
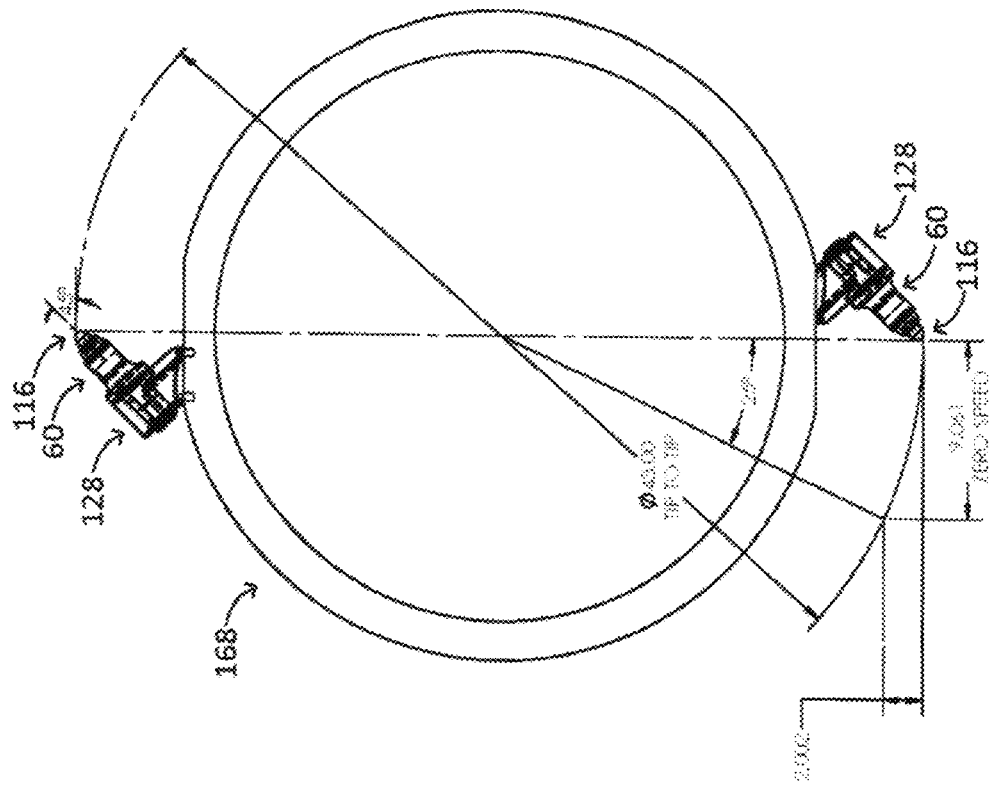
FIG. 27 is a diagram of two third embodiment bit/holders in base blocks mounted onto a drum, each bit/holder using the fourth embodiment of the tip insert, in accordance with implementations of this disclosure.
Figure 28:
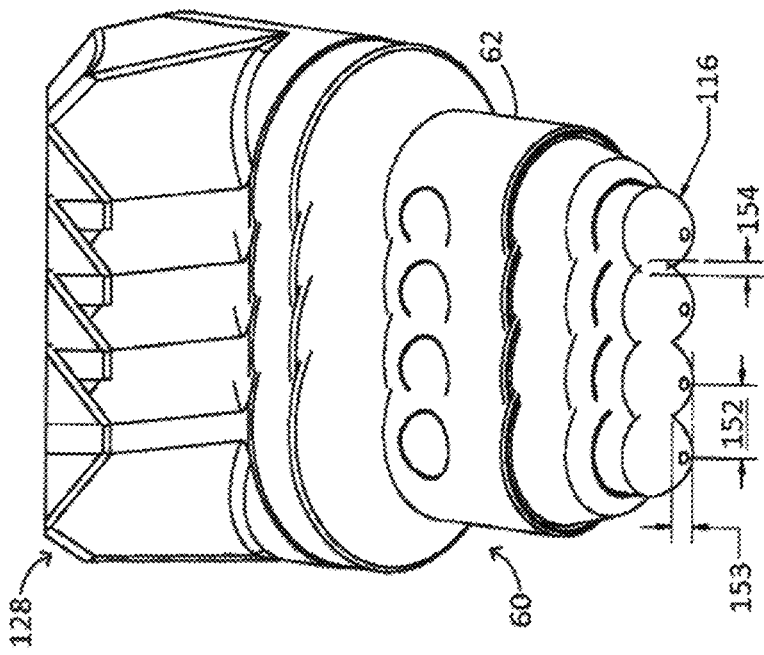
FIG. 28 is a diagram of a plurality of the third embodiment bit/holders in base blocks, each showing the fourth embodiment of the tip insert at a 0.173 inch depth of cavity with a diameter overlap of 0.119 inch and a 0.625 inch distance between the centerline of each tip insert to the centerline of the next tip insert, in accordance with implementations of this disclosure.
Figure 29:
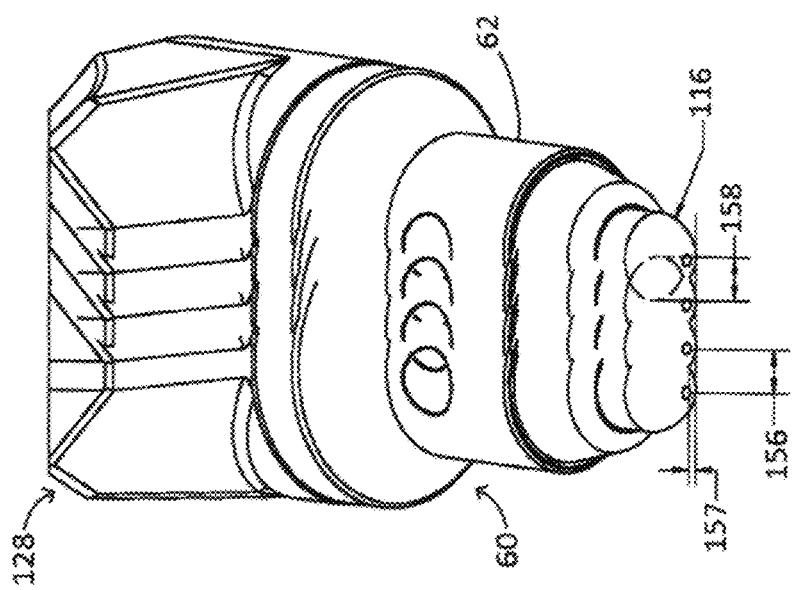
FIG. 29 is a diagram of a plurality of the third embodiment bit/holders in base blocks, each showing the fourth embodiment of the tip insert at a 0.057 inch depth of cavity with a diameter overlap of 0.366 inch and a 0.375 inch distance between the centerline of each tip insert to the centerline of the next tip insert, in accordance with implementations of this disclosure.
Figure 30:
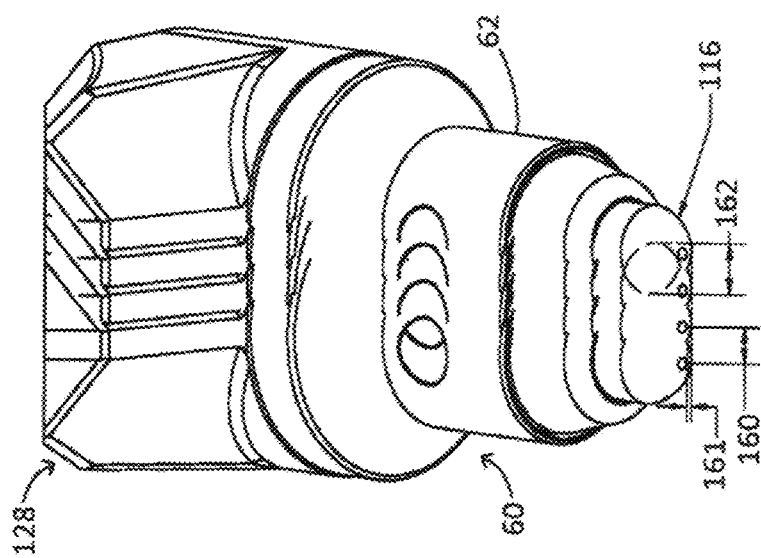
FIG. 30 is a diagram of a plurality of the third embodiment bit/holders in base blocks, each showing the fourth embodiment of the tip insert at a 0.039 inch depth of cavity with a diameter overlap of 0.431 inch and a 0.313 inch distance between the centerline of each tip insert to the centerline of the next tip insert, in accordance with implementations of this disclosure.
Figure 31:
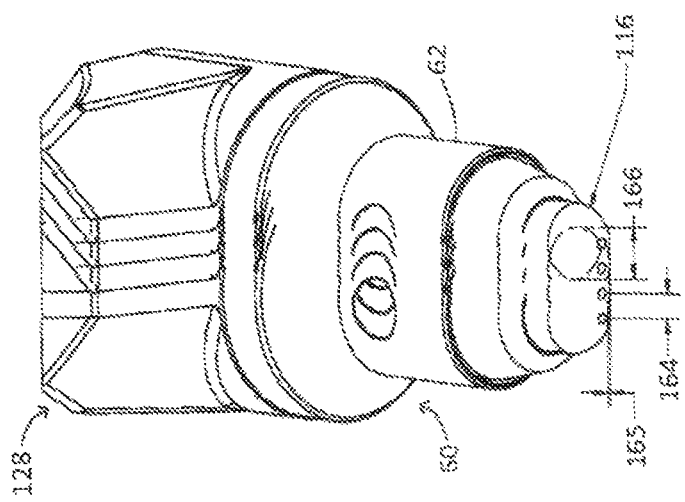
FIG. 31 is a diagram of a plurality of the third embodiment bit/holders in base blocks, each showing the fourth embodiment of the tip insert at a 0.023 inch depth of cavity with a diameter overlap of 0.506 inch and a 0.2369 inch distance between the centerline of each tip insert to the centerline of the next tip insert, in accordance with implementations of this disclosure.

FIG. 27 shows a diagram of two fourth embodiment tip inserts 116 in corresponding bit/holders 60 mounted in base blocks 128, which are in turn each mounted onto a drum 168. Referring to FIGS. 28-31, in one exemplary implementation of the fourth embodiment, several ¾ inch diameter PDC tip inserts 116 in corresponding bit/holders 60 mounted in base blocks 128 are shown in various configurations, where the tip inserts 116 have matching axial positions and where the full diameter of the tip inserts 116 are engaged in the cut. FIG. 28 is a diagram of the tip inserts 116, bit/holders 60, and base blocks 128 shown in a first configuration, where a distance 152 from a centerline of one tip insert 116 to a centerline of an adjacent tip insert 116 is about ⅝ inch at a 0.172 inch depth of cavity 153 when there is a diameter overlap zone 154 of about 0.062 inch between adjacent tip inserts 116. FIG. 29 is a diagram of the tip inserts 116, bit/holders 60, and base blocks 128 shown in a second configuration, where a distance 156 from a centerline of one tip insert 116 to a centerline of an adjacent tip insert 116 is ⅜ inch at a 0.057 inch depth of cavity 157 when there is a diameter overlap zone 158 of about 0.083 inch between adjacent tip inserts 116. FIG. 30 is a diagram of the tip inserts 116, bit/holders 60, and base blocks 128 shown in a third configuration, where a distance 160 from a centerline of one tip insert 116 to a centerline of an adjacent tip insert 116 is about 5/16 inch at a 0.039 inch depth of cavity 161 when there is a diameter overlap zone 162 of about 7/32 inch between adjacent tip inserts 116. FIG. 31 is a diagram of the tip inserts 116, bit/holders 60, and base blocks 128 shown in a fourth configuration, where a distance 164 from a centerline of one tip insert 116 to a centerline of an adjacent tip insert 116 is about 6 mm (0.236 inch) at a 0.023 inch depth of cavity 165 when there is a diameter overlap zone 166 of about 0.257 inch between adjacent tip inserts 116. As the bit assemblies are mounted closer together for finer road milling and/or micro milling, the diameter overlap zone between adjacent tip inserts 116 must be increased in order to have the centerline of one tip insert 116 aligned to the centerline of an adjacent tip insert 116.

Figure 32:
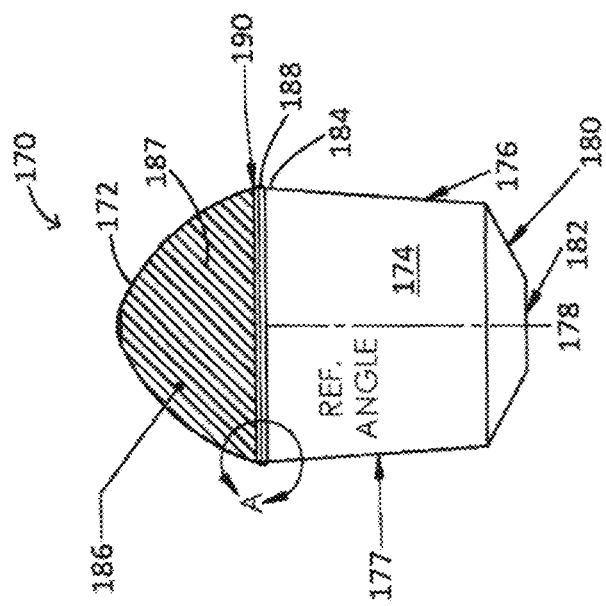
FIG. 32 is a front elevation view of a fifth embodiment of a tip insert in accordance with implementations of this disclosure.
Figure 33:
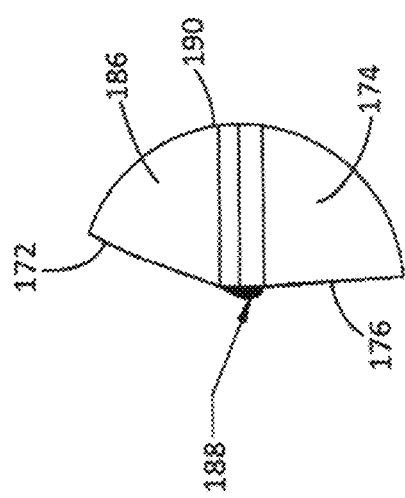
FIG. 33 is a detail front elevation view of Detail A of FIG. 32 of the fifth embodiment of the tip insert in accordance with implementations of this disclosure.

Referring to FIGS. 32-39, a fifth embodiment of a tip insert 170 in a fourth embodiment of a bit/holder 61, which is substantially the same as the third embodiment of the bit/holder 60 with an exception that the forward extension 108 comprises a tapered bore 115, of the present disclosure is shown. The tip insert 170 comprises a generally conical tip 172 at a forward end 184 of a base 174 that includes a parabolic curved section below an apex of the tip insert 170. In one exemplary implementation of the fifth embodiment, the tip insert 170 can have a diameter in the range of ⅝ inch to 1.250 inch. The base 174 comprises a complementary shaped positive generally cylindrical or declining tapered outer surface 176 that is adapted to be mounted in the radially declining tapered bore 115, or the generally cylindrical bore 112 in other embodiments, of the bit/holder 61. In one exemplary implementation of the fifth embodiment, the outer surface 176 of the base 174 includes a taper 177, of 4 degrees per side from a centerline 178 of the base 174, as shown in FIG. 32. In this fifth embodiment, the base 174 includes a frustoconical portion 180 adjacent a distal end 182 of the base 174. The outer surface 176, the frustoconical portion 180, and the distal end 182 of the base do not require additional finishing processes, such as grinding. The base 174 may be made of steel or tungsten carbide and includes the tip 172 at the outer or forward end 184 of the base 174. In this embodiment, an outer surface or forward end 186 of tip 172 has an overlay 187 of a polycrystalline diamond structure. The tip 172 can have a frustoconical shape, a flat generally cylindrical puck shape, a parabolic ballistic shape, and/or an arcuate shape. The outer surface 186 of the tip 172 may also have an overlay 187 of an industrial diamond material and may include a single coating or outer layer or multiple coating or outer layers of such industrial diamond material, natural diamond, polycrystalline diamond (PCD) material, and polycrystalline diamond composite or compact (PDC) material. The single or multiple coatings or layers may be formed by a high pressure, high temperature (HPHT) process. During the HPHT process, excess PCD material 188 forms a bulge between a distal end 190 of the tip 172 and the forward end 184 of the base 174. The excess PCD material 188, shown in detail in FIG. 33, can be used as formed on tools that are used in milling, trenching, mining, and similar applications. The overlay 187 occupies a large radial and axial profile of the tip 172 which allows faster heat transfer into a region subjacent to the overlay 187 PCD layer. Excessively high heat, such as temperatures above 1300 degrees F., is the greatest cause of PCD failure due to diamond connective failure. The quick heat transfer from the tip 172 of the PCD cutting zone, which is approximately ½ inch depth of cut per tip engagement, to the subjacent region below the PCD drastically reduces the possibility of a temperature of the tip 172 of the PCD reaching temperatures at or above 1300 degrees F. for any extended period of time thereby avoiding failure of the PCD layer.

Figure 35:
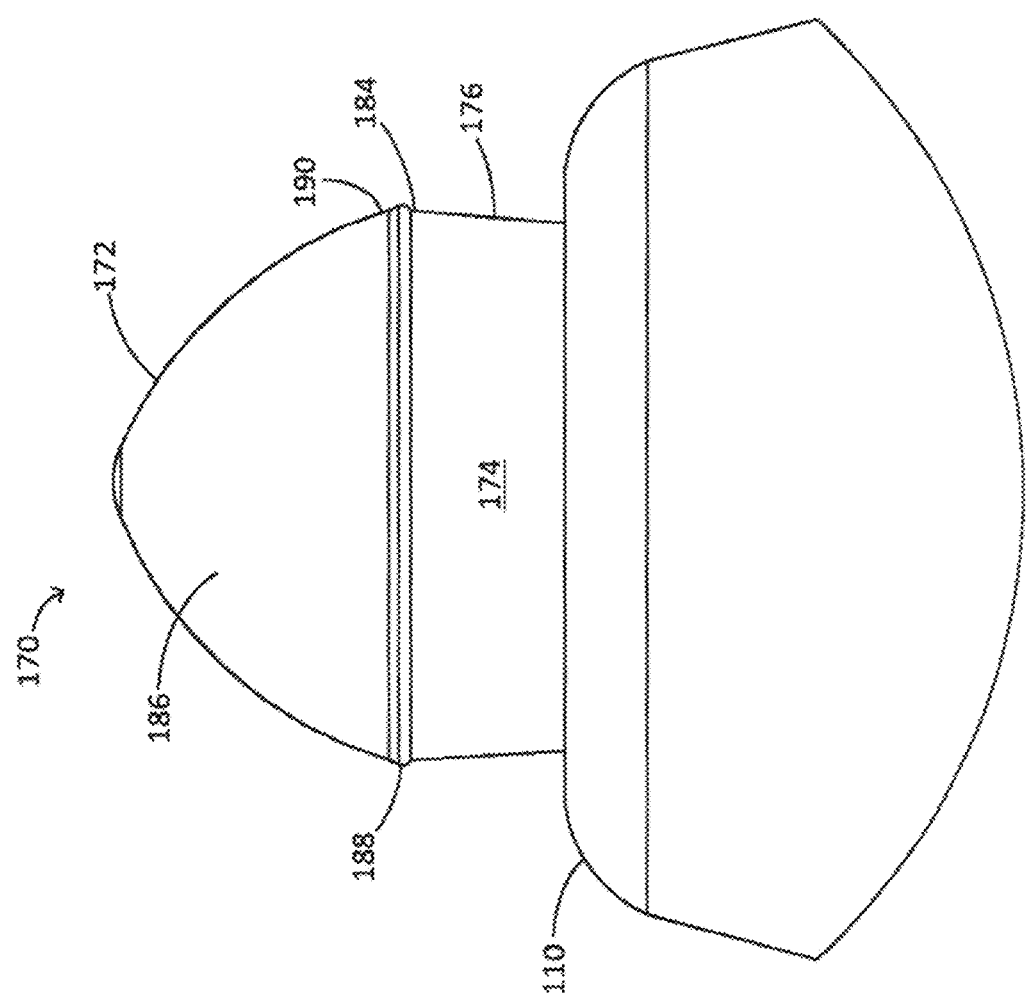
FIG. 35 is a detail front elevation view of Detail B of FIG. 34 of the fifth embodiment of the tip insert in accordance with implementations of this disclosure.
Figure 34:
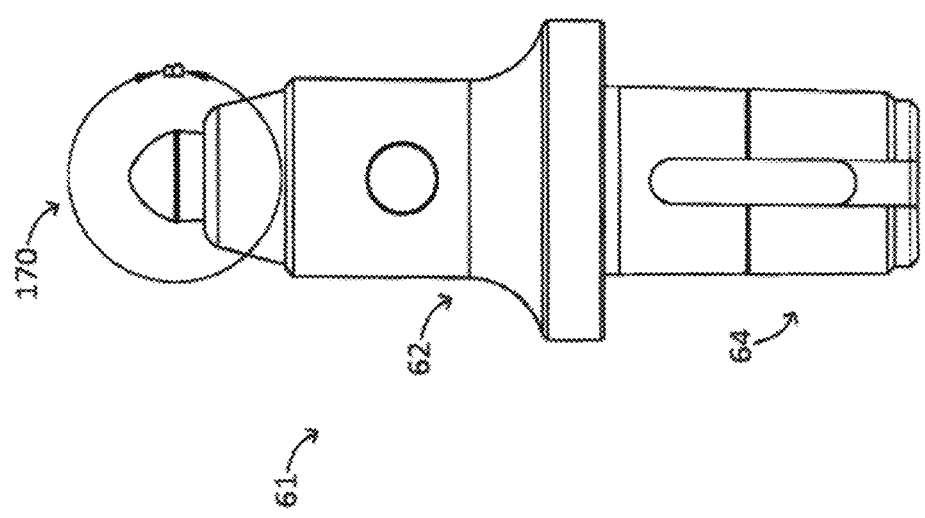
FIG. 34 is a front elevation view of the fifth embodiment of the tip insert, shown in a fourth embodiment of a bit/holder, in accordance with implementations of this disclosure.
Figure 36:
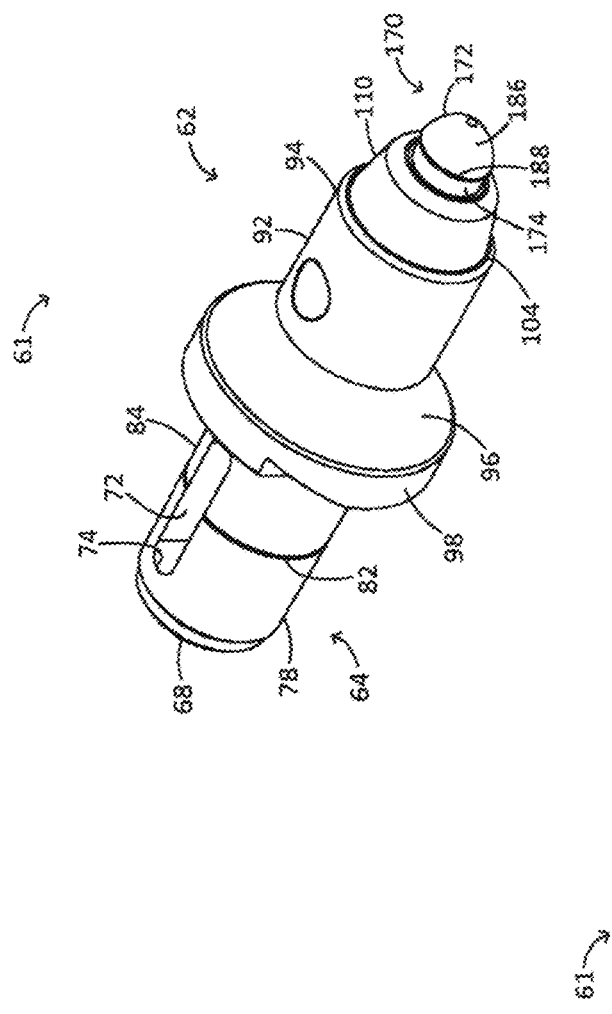
FIG. 36 is a perspective view of the fifth embodiment of the tip insert, shown in the fourth embodiment of the bit/holder, in accordance with implementations of this disclosure.
Figure 37:
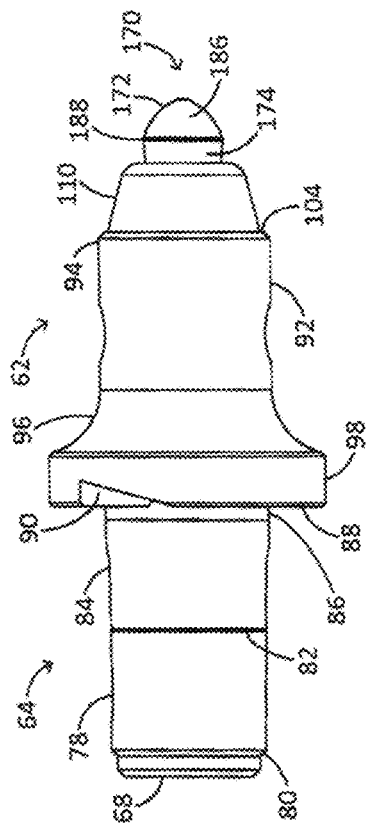
FIG. 37 is a side elevation view of the fifth embodiment of the tip insert, shown in the fourth embodiment of the bit/holder, in accordance with implementations of this disclosure.
Figure 38:
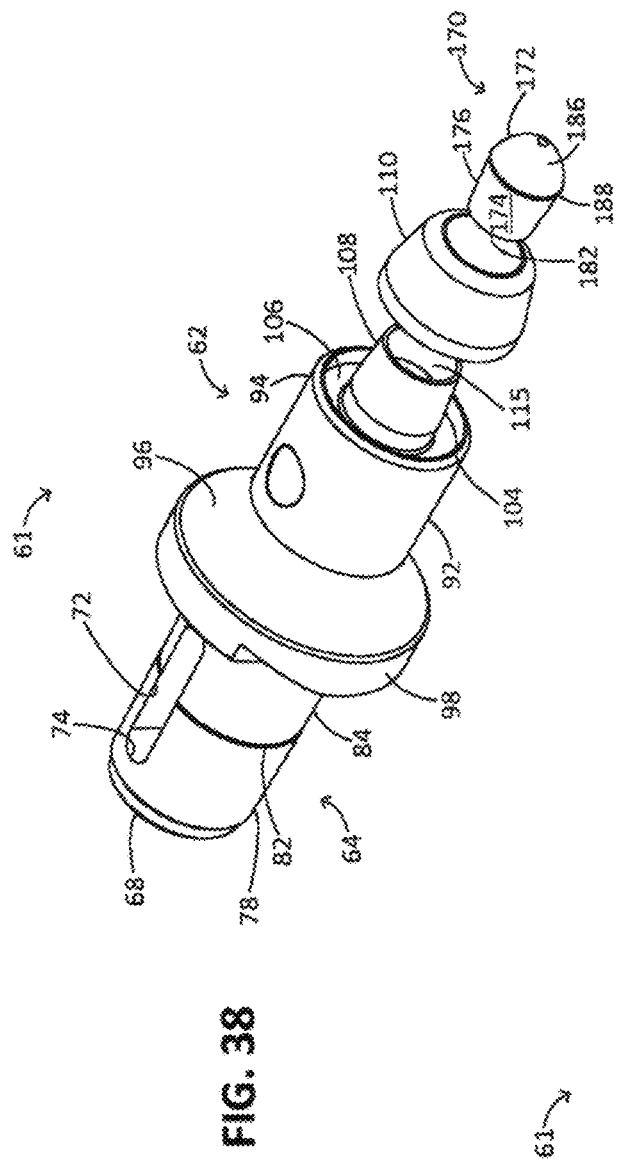
FIG. 38 is an exploded side perspective view of the fifth embodiment of the tip insert, shown with the fourth embodiment of the bit/holder, in accordance with implementations of this disclosure.
Figure 39:
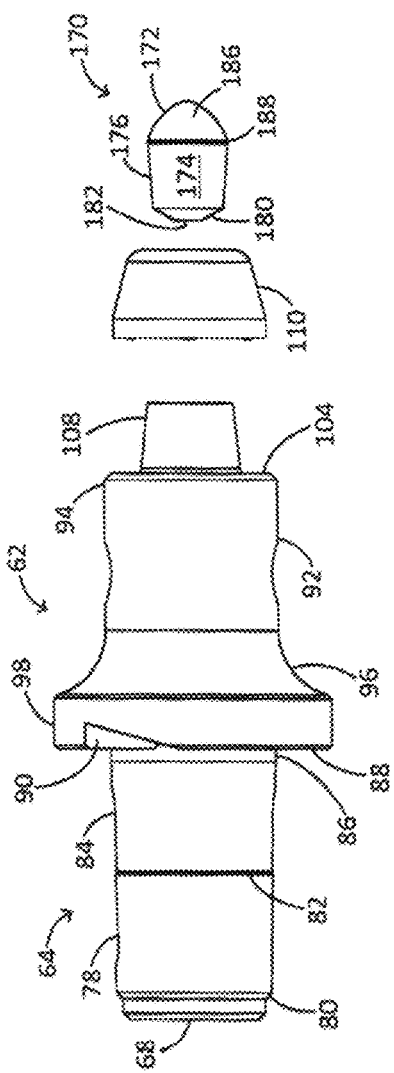
FIG. 39 is an exploded side elevation view of the fifth embodiment of the tip insert, shown with the fourth embodiment of the bit/holder, in accordance with implementations of this disclosure.

FIG. 34 shows the tip insert 170 of the fifth embodiment mounted in the bit/holder 61. FIG. 35 shows a detail view of the tip insert 170 of the fifth embodiment mounted within the annular ring 110 of the bit/holder 61 of FIG. 34. FIGS. 36 and 37 show the tip insert 170 of the fifth embodiment mounted in the bit/holder 61. FIGS. 38-39 show exploded views of how the tip insert 170 of the fifth embodiment is assembled with the bit/holder 61.

Figure 40:
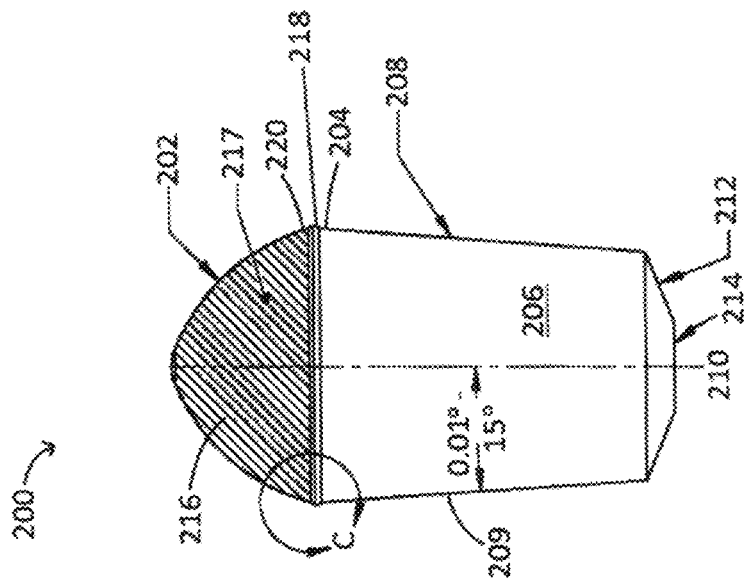
FIG. 40 is a front elevation view of a sixth embodiment of a tip insert in accordance with implementations of this disclosure.
Figure 41:
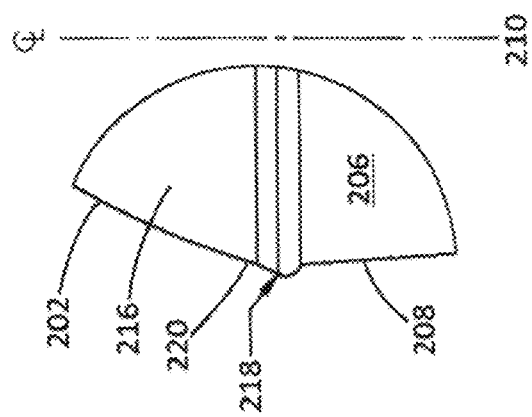
FIG. 41 is a detail front elevation view of Detail C of FIG. 40 of the sixth embodiment of the tip insert in accordance with implementations of this disclosure.

Referring to FIGS. 40 and 41, a sixth embodiment of a tip insert 200 of the present disclosure is shown. The tip insert 200 comprises a generally conical tip 202 at a forward end 204 of a base 206 that includes a parabolic curved section below an apex of the tip 202. In one exemplary implementation of the sixth embodiment, the tip insert 200 can have a diameter in the range of ⅝ inch to 1.250 inch and a length of 1⅜ inch±1/16 inch. The base 206 comprises a complementary shaped positive generally cylindrical or declining tapered outer surface 208 that is adapted to be mounted in the generally cylindrical bore 112 of the bit/holder 60 or the tapered bore 115 of the bit/holder 61, respectively. In one exemplary implementation of the sixth embodiment, the outer surface 208 of the base 206 includes a taper 209 in the range of and including 1/100 of 1 degree to 15 degrees per side from a centerline 210 of the base 206, as shown in FIG. 40. In this sixth embodiment, the base 206 includes a frustoconical portion 212 adjacent a distal end 214 of the base 206. The outer surface 208, the frustoconical portion 212, and the distal end 214 of the base 206 do not require additional finishing processes, such as grinding. The base 206 may be made of steel or tungsten carbide and includes the tip 202 at the outer or forward end 204 of the base 206. In this embodiment, an outer surface or forward end 216 of tip 202 has an overlay 217 of a polycrystalline diamond structure. The tip 202 can have a frustoconical shape, a flat generally cylindrical puck shape, a parabolic ballistic shape, and/or an arcuate shape. The outer surface 216 of the tip 202 may also have an overlay 217 of an industrial diamond material and may include a single coating or outer layer or multiple coating or outer layers of such industrial diamond material, natural diamond, polycrystalline diamond (PCD) material, and polycrystalline diamond composite or compact (PDC) material. The single or multiple coatings or layers may be formed by a high pressure, high temperature (HPHT) process. During the HPHT process, excess PCD material 218 forms a bulge between a distal end 220 of the tip 202 and the forward end 204 of the base 206. The excess PCD material 218, shown in detail in FIG. 41, can be used as formed on tools that are used in milling, trenching, mining, and similar applications. The overlay 217 occupies a large radial and axial profile of the tip 202 which allows faster heat transfer into a region subjacent to the overlay 217 PCD layer. Excessively high heat, such as temperatures above 1300 degrees F., is the greatest cause of PCD failure due to diamond connective failure. The quick heat transfer from the tip 202 of the PCD cutting zone, which is approximately ½ inch depth of cut per tip engagement, to the subjacent region below the PCD drastically reduces the possibility of a temperature of the tip 202 of the PCD reaching temperatures at or above 1300 degrees F. for any extended period of time thereby avoiding failure of the PCD layer.

Figure 44:
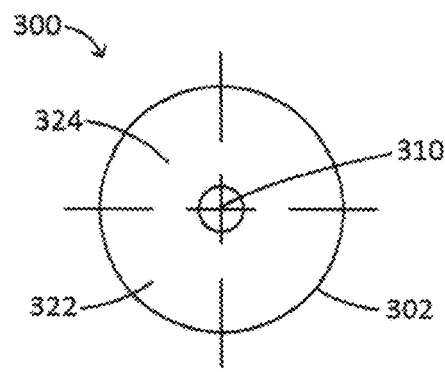
FIG. 44 is a top elevation view of the seventh embodiment of the tip insert in accordance with implementations of this disclosure.
Figure 42:
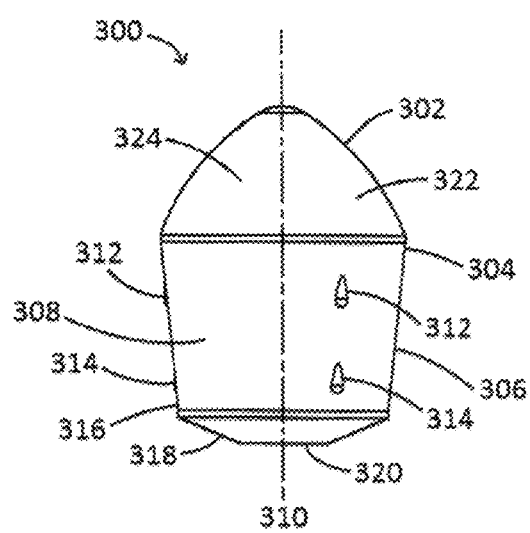
FIG. 42 is an elevation view of a seventh embodiment of a tip insert in accordance with implementations of this disclosure.
Figure 43:
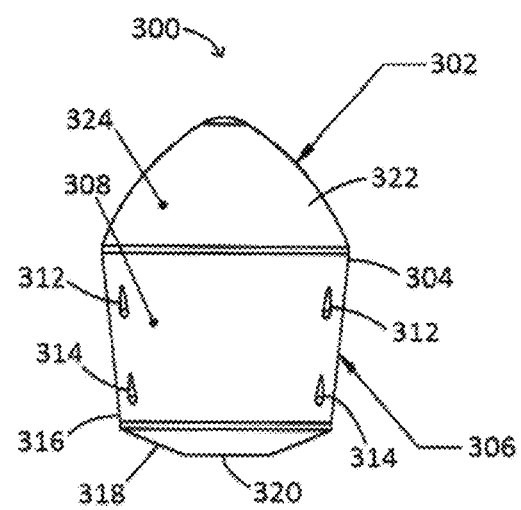
FIG. 43 is an elevation view of the seventh embodiment of the tip insert in accordance with implementations of this disclosure.
Figure 47:
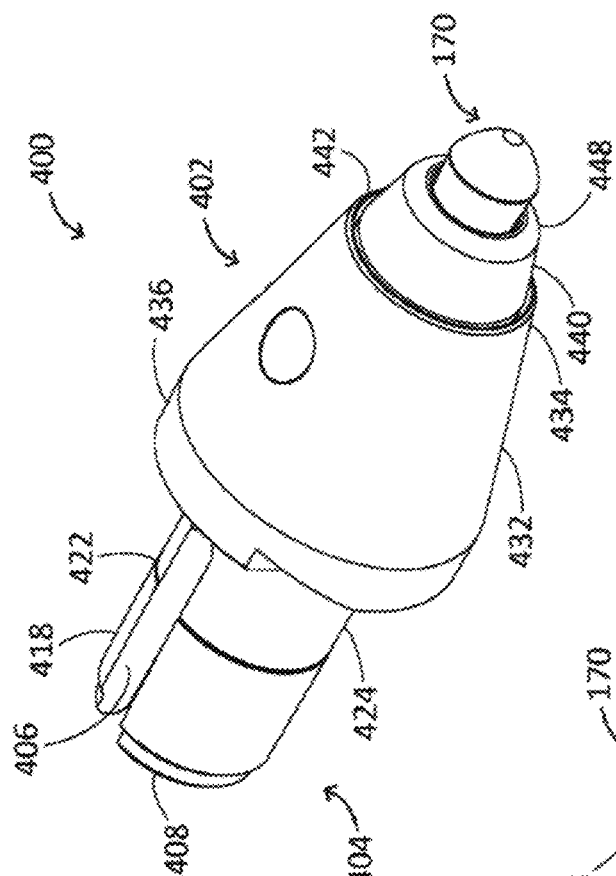
FIG. 47 is a front perspective view of the fifth embodiment of the bit/holder, shown with the fifth embodiment of the tip insert, in accordance to implementations of this disclosure.
Figure 48:
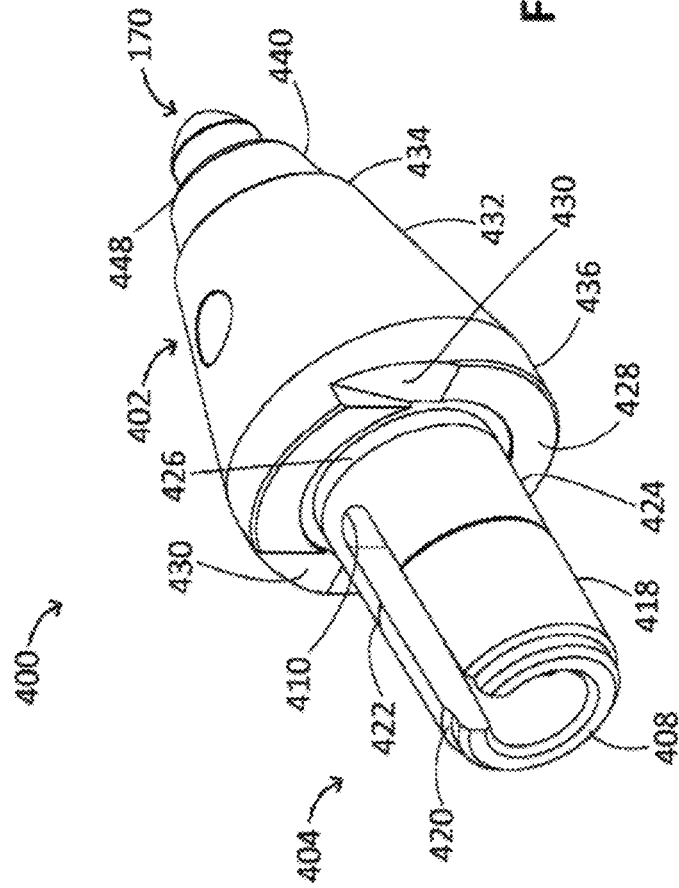
FIG. 48 is a rear perspective view of the fifth embodiment of the bit/holder, shown with the fifth embodiment of the tip insert, in accordance with implementations of this disclosure.

Referring to FIGS. 42-44, a seventh embodiment of a tip insert 300 of the present disclosure is shown. The tip insert 300 comprises a generally conical tip 302 at a forward end 304 of a base 306 that includes a parabolic curved section below an apex of the tip 302. In this exemplary implementation of the seventh embodiment, the base 306 comprises a complementary shaped declining tapered outer surface 308 that is adapted to be mounted in the tapered bore 115 (FIG. 38) of the bit/holder 61. In an alternate embodiment, the base 306 can comprise a complementary shaped positive generally cylindrical outer surface (not shown) that is adapted to be mounted in the generally cylindrical bore 112 of the bit/holder 60. The outer surface 308 of the base 306 includes a taper in the range of and including 1/100 of 1 degree to 15 degrees per side from a centerline 310 (FIGS. 42 and 44) of the base 306. The outer surface 308 of the base 306 comprises a first plurality of circumferentially spaced protrusions 312 adjacent the forward end 304 of the base 306 and a second plurality of circumferentially spaced protrusions 314 adjacent a rearward end 316 of the base 306, the first plurality of circumferentially spaced protrusions 312 and the second plurality of circumferentially spaced protrusions 314 adapted to provide for precision spacing between the parts, and both self-centering and self-aligning of the tip insert 300 in the bore 115 of the bit/holder 61. In this exemplary implementation of the seventh embodiment, preferably the outer surface 308 of the base 306 is sufficiently spaced from an inner wall (not shown) of the bore 115 of the bit/holder 61 and a frustoconical portion 318 adjacent a distal end 320 of the base 306 is sufficiently spaced from a bore termination (not shown) of the bore 115 of the bit/holder 61 to allow braze material to flow between the parts.

The outer surface 308, the frustoconical portion 318, and the distal end 320 of the base 306 do not require additional finishing processes, such as grinding. The base 306 may be made of steel or tungsten carbide and includes the tip 302 at the outer or forward end 304 of the base 306. In this embodiment, the tip 302 has a parabolic shape and an outer surface or forward end 322 of tip 302 has an overlay 324 of a polycrystalline diamond structure. The tip 302 can also have a frustoconical shape, a flat generally cylindrical puck shape, and/or an arcuate shape. The outer surface 322 of the tip 302 may also have an overlay 324 of an industrial diamond material and may include a single coating or outer layer or multiple coating or outer layers of such industrial diamond material, natural diamond, polycrystalline diamond (PCD) material, and polycrystalline diamond composite or compact (PDC) material. The single or multiple coatings or layers may be formed by a high pressure, high temperature (HPHT) process. In other embodiments, the tip insert 300 may be a unitary piece of tungsten carbide, a diamond PCD overlay-insert attached via the HPHT process to a forward end of a tungsten carbide base, and/or a composite PCD tip portion brazed to a forward end of a tungsten carbide base.

Referring to FIGS. 45-48, a fifth embodiment of a bit/holder 400 of the present disclosure is shown with the fifth embodiment of the tip insert 170, as described above. The bit/holder 400 is a unitary bit and bit holder construction that includes a body 402 and a generally cylindrical hollow shank 404 axially depending from a bottom of the body 402. The shank 404 including an elongate first slot 406 extending from a generally annular distal end 408 of the shank 404 axially upward or forward to an upper termination 410 adjacent the upper or forward end of the shank 404. In this embodiment, the shank 404 also includes an internally oriented second slot 412 located approximately 180 degrees around the annular shank 404 from the first slot 406. This second slot 412 is parallel to the first slot 406 and is an internal slot having a rearward semicircular termination 414 inwardly adjacent to the distal end 408 of the shank 404 and a forward semicircular termination 416 (not shown) generally coinciding longitudinally and axially with the upper termination 410 of the first slot 406.

In this illustrated embodiment, the shank 404 preferably includes a lower or first tapered portion 418 running axially from a stepped shoulder 420 adjacent the distal end 408 of the shank 404. The stepped shoulder 420 is disposed between the lower tapered portion 418 and the distal end 408. A diameter of the stepped shoulder 420 increases, or steps up, as it axially extends from the distal portion 408 to the lower tapered portion 418. The first tapered portion 418 runs upwardly or axially from the stepped shoulder 420 of the shank 404 and terminates generally mid slot 406 longitudinally. The shank 404 also includes an annular shoulder 422 separating the lower tapered portion 418 from an upper or second tapered portion 424 which extends from the shoulder 422 generally adjacent to the top of the shank 404 or forward terminations 410, 416 of slots 406, 412, respectively. The annular shoulder 422 is disposed between the lower tapered portion 418 and the upper tapered portion 424. A diameter of the annular shoulder 422 decreases, or steps down, as it axially extends from the lower tapered portion 418 to the upper tapered portion 424. A generally cylindrical top portion 426 of the shank 404 extends from a position adjacent the top or upper terminations 410, 416 of slots 406, 412, respectively, towards a generally annular back flange 428 that denotes the base of bottom of the body 402 of the bit/holder 400.

The generally annular back flange 428 includes a pair of horizontal slots 430-430 generally perpendicular to the longitudinal axis of the combination bit/holder, one on either side of the generally annular flange 428. The horizontal slots 430-430 are configured to receive a pair of bifurcated fork tines that may be inserted between the base of the body 402 and the bit/holder 400 and a base block (not shown) into which the shank 404 of the bit/holder combination is inserted and retained by outward radial force when in use.

In this fifth illustrated embodiment of the bit/holder 400, the bit holder body 402 includes a generally frustoconical upper body portion 432 depending from a forward end 434 of the body 402. The upper body portion 432 tapers radially outwardly from an axis of the bit/holder 400 to a radially extending generally cylindrical tire portion 436.

A central bore 438 (not shown) longitudinally and axially extending through the shank 404 of the bit holder body 402 of the bit/holder 400 combination terminates at bore termination (not shown), which can have a flat shape or a conical shape, that is approximately at the upper end of the shank 404. This allows the generally C-shaped annular side wall of the shank 404 to radially contract when the shank 404 is mounted in one of a tapered and/or cylindrical bore in a base block (not shown).

The bit holder body 402, in order to provide superior brazing of a tungsten carbide ring 440 to the forward end 434 of the bit/holder 400, includes a forwardly extending annular collar 442 (FIG. 47) that is created on the bit holder body 402 to provide an annular trough 444 (not shown) around a tapered forward extension 446 (not shown) of the bit holder body 402 onto which the annular ring 440 is mounted. The vertical outer wall of the trough 444 will keep brazing material from flowing outwardly of the joinder between the base of the ring 440 and the annular collar 442. The annular trough 444, on which the ring 440 is positioned, is therearound positioned perpendicular to the axis of the bit/holder 400 from the interior of which axially extends the smaller radially oriented annular tapered upper or forward extension 446. Around this tapered forward extension 446 is fitted the annular tungsten carbide ring 440, seated in the annular trough 444, which may preferably be brazed into unitary construction with the remainder of the bit/holder 400. The top or forwardmost portion of the tungsten carbide ring 440 and the annular tapered forward extension 446 of the upper body portion 432 terminate generally at an end 448 of the bit holder body 402 of the combination bit/holder 400.

With the bit holder body 402 of the present disclosure preferably made of 4340 or equivalent steel, the top of the forward extension 446 of the upper body 432 includes a radially declining tapered bore 115 extending from the co-terminal upper wall of the body axially inwardly thereof which defines, in this illustrated embodiment, a hollow tapered shape. In other embodiments, the bore can also have a generally cylindrical shape or a slight draw or draft angle. The bore 115 extends a short distance longitudinally axially inwardly of the end 448 of the forward extension 446 to define a base 450 (not shown) for the tip insert base 174. The base 450, in this illustrated embodiment, has a conical shape. The tapered bore 115 provides a space for receiving a complementary shaped declining tapered outer surface 176 of the base 174 of the tip insert 170 for the bit/holder combination.

Figure 53:
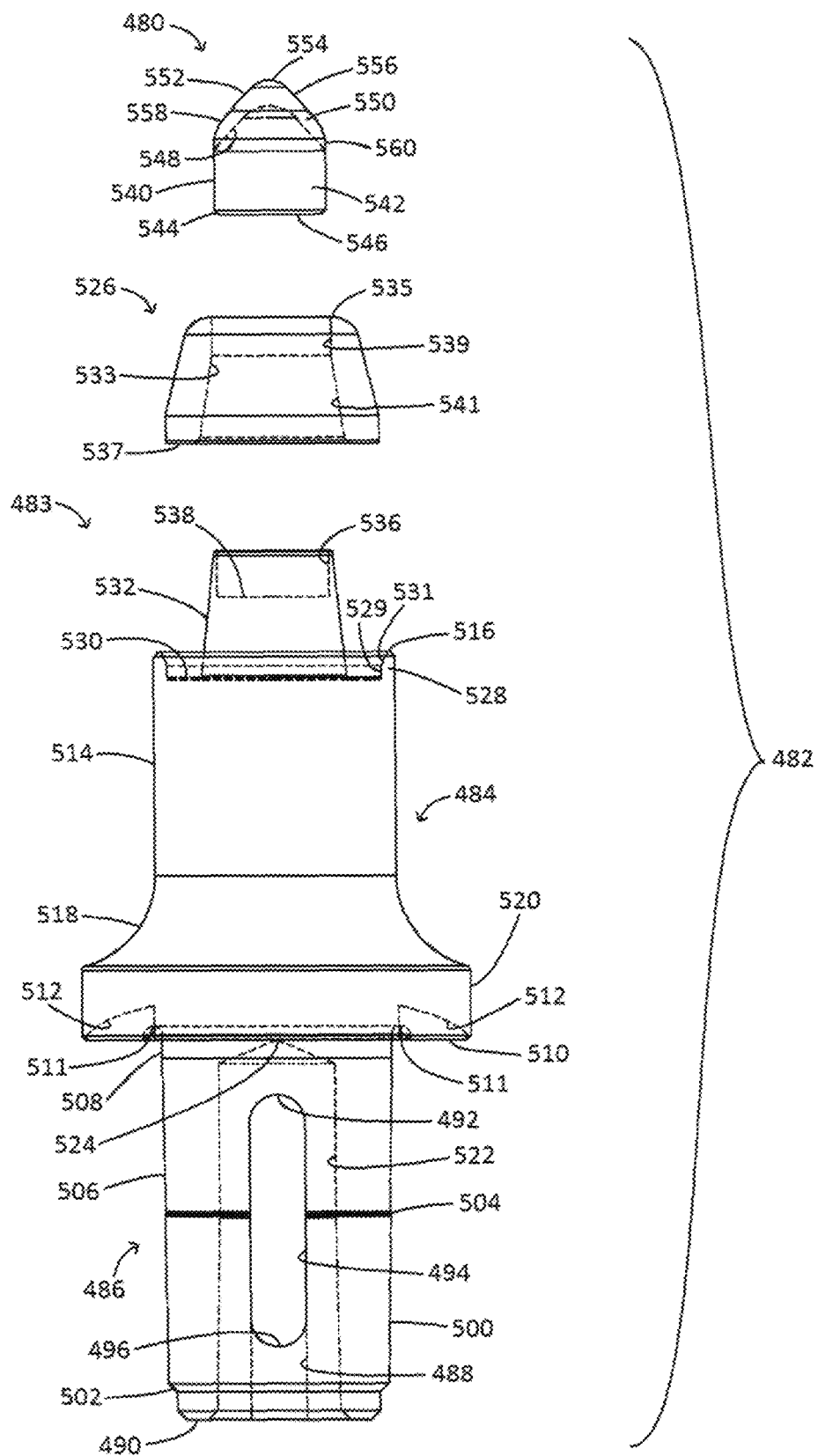
FIG. 53 is an exploded elevation view of a sixth embodiment of a bit/holder and an eighth embodiment of a tip insert, showing invisible internal elements in dotted lines, in accordance with implementations of this disclosure.
Figures 54, 55:
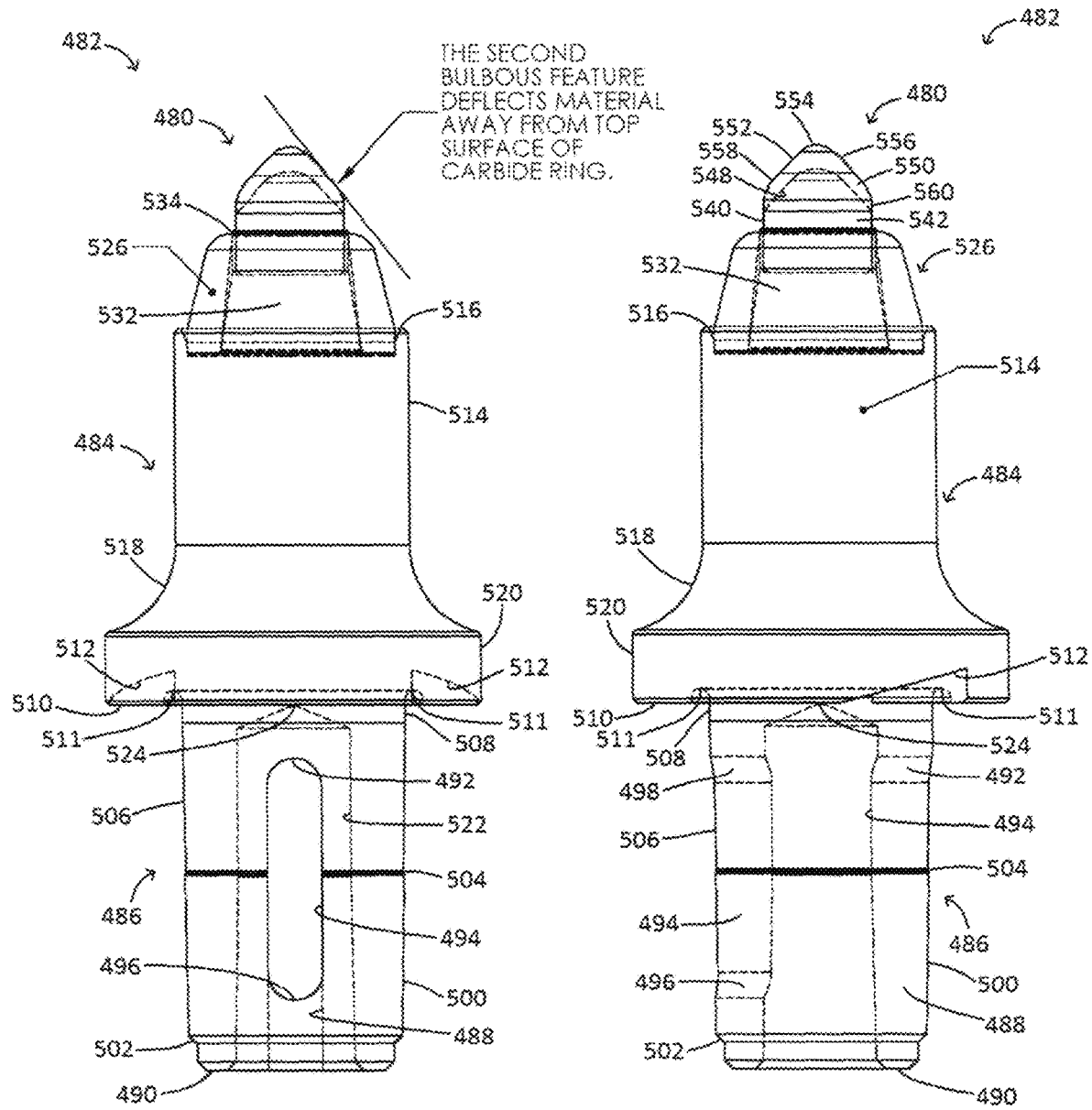
FIG. 54 is an elevation view of the sixth embodiment of the bit/holder and the eighth embodiment of the tip insert, showing invisible internal elements in dotted lines, in accordance with implementations of this disclosure.
FIG. 55 is an elevation view of the sixth embodiment of the bit/holder and the eighth embodiment of the tip insert, showing invisible internal elements in dotted lines, in accordance with implementations of this disclosure.

Referring to FIGS. 53-55, a sixth embodiment of a non-rotating bit/holder 482 is shown with an eighth embodiment of a tip insert 480, that includes parabolic curved sections below an apex of the tip insert 480. The bit/holder 482 is a unitary bit tip insert 480 and bit holder 483 (FIG. 53) combination that includes a body 484 and a generally cylindrical hollow shank 486 axially depending from a bottom of the body 484. The shank 486, in this illustrated embodiment, is approximately standard 2½ inch length shank. The shank 486 includes an elongate first slot 488 extending from a generally annular distal end 490 of the shank 486 axially upward or forward to an upper termination 492 adjacent the upper or forward end of the shank 486. In this embodiment, the shank 486 also includes an internally oriented second slot 494 located approximately 180 degrees around the annular shank 486 from the first slot 488. This optional second slot 494 is parallel to the first slot 488 and is an internal slot having a rearward semicircular termination 496 inwardly adjacent to the distal end 490 of the shank 486 and a forward semicircular termination 498 (FIG. 55) generally coinciding longitudinally and axially with the upper termination 492 of the first slot 488.

In this illustrated embodiment, the shank 486 preferably includes a lower or first tapered portion 500 running axially from a stepped shoulder 502 adjacent the distal end 490 of the shank 486. The stepped shoulder 502 is disposed between the lower tapered portion 500 and the distal end 490. A diameter of the stepped shoulder 502 increases, or steps up, as it axially extends from the distal end 490 to the lower tapered portion 500. The first tapered portion 500 runs upwardly or axially from the stepped shoulder 502 of the shank 486 and terminates generally mid slot 488 longitudinally. The shank 486 also includes an annular shoulder 504 separating the lower tapered portion 500 from an upper or second tapered portion 506 which extends from the shoulder 504 generally adjacent to the top of the shank 486 or forward terminations 492, 498 of slots 488, 494, respectively. The annular shoulder 504 is disposed between the lower tapered portion 500 and the upper tapered portion 506. A diameter of the annular shoulder 504 decreases, or steps down, as it axially extends from the lower tapered portion 500 to the upper tapered portion 506. A generally cylindrical top portion 508 of the shank 486 extends from a position adjacent the top or upper terminations 492, 498 of slots 488, 494, respectively, towards a generally annular back flange 510 that denotes the base or bottom of the body 484 of the bit/holder 482. The top of the shank 486 may include a rounded junction 511 between the top portion 508 of the shank 486 and the generally annular back flange 510 of the body 484 of the bit/holder 482, which is provided to avoid sharp corners which may provide an area for stress cracks to begin. In other embodiments, the shank 486 may comprise different configurations, for example, the lower portion 500 and/or the upper portion 506 of the shank 486 may comprise a generally cylindrical shape, a slight draw angle, or a slight draft angle.

The generally annular flange 510 includes a pair of horizontal slots 512-512 generally perpendicular to the longitudinal axis of the combination bit/bit holder, one on either side of the generally annular flange 510. The horizontal slots 512-512 are configured to receive a pair of bifurcated fork tines that may be inserted between the base of the body 484 of the bit/holder 482 and a base block (not shown) into which the shank 486 of the bit/holder combination is inserted and retained by outward radial force in use.

A central bore 522 longitudinally and axially extending through the shank 486 of the bit/holder 482 combination terminates at bore termination 524, which in this illustrated embodiment has a conical shape, that is approximately at the upper end of the shank 486. This allows the generally C-shaped annular side wall of the shank 486 to radially contract when the shank 486 is mounted in one of a tapered or cylindrical bore in a base block (not shown).

In this sixth illustrated embodiment of the bit/holder 482, the bit holder body 484 includes a generally cylindrical or annular upper body portion 514, which could also be tapered in an alternate embodiment, depending from a forward end 516 of the body 484. A mediate body portion 518 subjacent the upper body portion 514 generally slopes axially and radially outwardly to a radially extending generally cylindrical tire portion 520. Additionally, in an alternate embodiment, a mid-section of the upper body portion 514 of the bit/holder 482 may include a cross or through hole (not shown) substantially perpendicular to the longitudinal axis of the bit/holder 482. This cross hole (not shown) extends horizontally through the upper body portion 514 and forms a receiver for a drift pin (not shown) used in connection with a cup portion of a bit/holder insertion-removal tool.

The bit holder body 484, in order to provide superior brazing of a tungsten carbide ring 526 to the forward end 516 of the bit/holder 484, includes a forwardly extending annular collar 528 that is created on the bit holder body 484 to provide an annular trough 530 around a tapered forward extension 532 of the bit holder body 484 onto which the annular ring 526 is mounted, which provides superior brazing of the base of the tungsten carbide ring 526 in the annular trough 530. In this illustrated embodiment, the annular collar 528 includes a generally cylindrical bottom inner wall 529 and a tapered top inner wall or countersink 531. The vertical outer wall of the trough 530 will keep brazing material from flowing outwardly of the joinder between the base of the ring 526 and the annular collar 528. The annular trough 530, on which the ring 526 is positioned, is therearound positioned perpendicular to the axis of the bit/holder 482 from the interior of which axially extends the smaller radially oriented annular tapered upper or forward extension 532. Around this tapered forward extension 532 is fitted the annular tungsten carbide ring 526, seated in the annular trough 530, which may preferably be brazed into unitary construction with the remainder of the bit/holder 482. The top or forwardmost portion of the tungsten carbide ring 526 and the annular tapered forward extension 532 of the upper body portion 514 terminate generally at an end 534 (FIGS. 54 and 55) of the bit holder 483 of the combination bit/holder 482.

The tungsten carbide ring 526 includes a bore 533 that axially extends from a top 535 of the tungsten carbide ring 526 to a base 537 of the tungsten carbide ring 526. The bore 533, in this illustrated embodiment, includes a generally cylindrical top inner surface 539 adjacent the top 535 of the tungsten carbide ring 526 and an outwardly tapered bottom inner surface 541 adjacent the base 537 of the tungsten carbide ring 526. In other embodiments, the bore can also have other configurations, for example, a hollow generally cylindrical configuration or the bore can be outwardly tapered from the top surface to the bottom surface.

With the bit holder body 484 of the present disclosure preferably made of 4340 or equivalent steel, the top of the forward extension 532 of the upper body 514 includes a generally cylindrical bore 536 extending from the co-terminal upper wall of the body axially inwardly thereof which defines, in this illustrated embodiment, a hollow generally cylindrical shape. In other embodiments, the bore can also have a radially declining taper or a slight draw or draft angle. The bore 536 extends a short distance longitudinally axially inwardly of the end 534 of the forward extension 532 to define a base 538 for the tip insert 480. The base 538, in this illustrated embodiment, is flat but can alternatively be frustoconically shaped in another embodiment.

The generally cylindrical bore 536 provides a space for receiving a complementary shaped positive generally cylindrical or declining tapered outer surface 540 of a base 542 of the tip insert 480 for the bit/holder combination which is brazed within the bore 536 of the forward extension 532. Braze material completely attaches to the outer surface of the base 542 and a distal end 546 of the tip insert 480, the bore 536 of the forward extension 532, and the base 538 of the forward extension 532. In one exemplary implementation of the eighth embodiment, the tip insert 480 can have a diameter in the range of ⅝ inch to 1.250 inch. In this eighth embodiment, the base 542 includes a chamfer 544 adjacent the distal end 546 of the base 542. The base 542 may be made of steel or tungsten carbide.

In this embodiment, an outer surface or forward end 548 of base 542 has an overlay 550 of a polycrystalline diamond structure that forms a forward end or outer surface 552 of the overlay 550 of the tip insert 480. The overlay 550 can include an industrial diamond material and may be a single coating or outer layer or multiple coating or outer layers of such industrial diamond material, natural diamond, polycrystalline diamond (PCD) material, and polycrystalline diamond composite or compact material, and/or thermally stable polycrystalline (TSP) diamond. Additional fusing additives, such as cobalt, are used to enhance the connective fusion and bonding of the diamond particles together. The single or multiple coatings or layers may be formed by a high pressure, high temperature process. The overlay 550 occupies a large radial and axial profile of a tip 554 of the bit tip insert 480, which allows faster heat transfer into a region subjacent to the overlay 550 PCD layer. Excessively high heat, such as temperatures above 1300 degrees F., is the greatest cause of PCD failure due to diamond connective failure, the quick heat transfer from the tip 554 of the PCD cutting zone, which is approximately ¼ inch depth of cut per tip engagement, to the subjacent region below the PCD tip 554 drastically reduces the possibility of a temperature of the tip 554 of the PCD reaching temperatures at or above 1300 degrees F. for any extended period of time thereby avoiding failure of the PCD layer.

Referring to FIGS. 56-57, the forward end 552 of the tip insert 480 can have a frustoconical shape, a flat generally cylindrical puck shape, a parabolic ballistic shape, and/or an arcuate shape. As in the previous embodiments, a forward end of base 542 of the tip insert 480 includes a convex base tip merging into a conical side, as shown in FIG. 56. In this illustrated embodiment, the forward end, or outer surface 552 of the overlay 550, of the tip insert 480 comprises the tip 554, a first parabolic section 556 subjacent the tip 554, a second parabolic section 558 adjacent the first parabolic section 556, and a generally cylindrical section 560 adjacent the second parabolic section 558, as shown in FIG. 56. The second parabolic section 558 deflects loosened material away from the forward end of the bit/holder 482 and the tungsten carbide ring 526. In this exemplary implementation, the apex of the tip 554 has a radius of curvature of 0.160 inch and the thickness of the overlay 550 varies from 0.125 inch, from the apex of the tip 554 to the forward end 548 of the base 542 of the tip insert 480, to 0.080 inch, from the forward end 552 of the tip insert 480 to the outer surface 540 of the base 542 of the tip insert 480.

Figure 58:
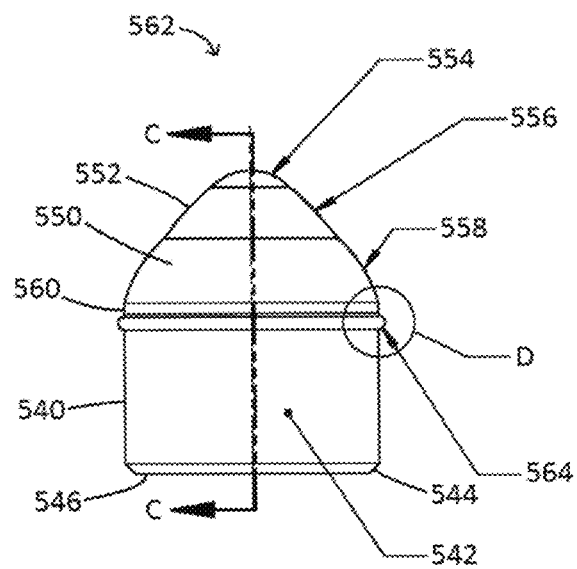
FIG. 58 is an elevation view of a ninth embodiment of a tip insert in accordance with implementations of this disclosure.
Figure 59:
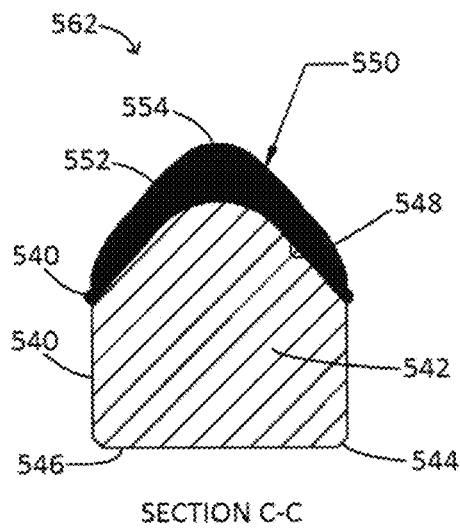
FIG. 59 is an elevation view of the ninth embodiment of the tip insert taken along line C-C of FIG. 58, showing the diamond layer in solid black and the substrate in hatching lines, in accordance with implementations of this disclosure.
Figure 60:
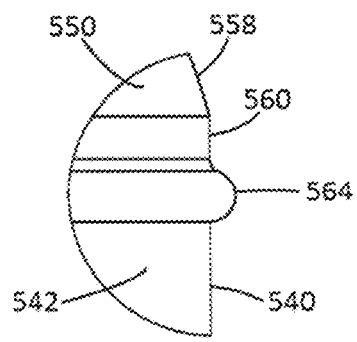
FIG. 60 is a detail side elevation view of Detail D of FIG. 58 of the ninth embodiment of the tip insert in accordance with implementations of this disclosure.

Referring to FIGS. 58-60, a ninth embodiment of a tip insert 562, that includes parabolic curved sections below an apex of the tip insert 562. The tip insert 562 of the ninth embodiment is substantially the same as the tip insert 480 of the eighth embodiment with an exception that the overlay 550 of the tip insert 562 includes a ridge or overfill portion 564 adjacent the generally cylindrical section 560. The overfill or over formed portion 564 may not be regular in shape and does not need to be ground or removed into any specific shape. This added diameter also affects the shape of the finished surface as will be discussed in more detail below. It should be noted that with the greater diameter and outward extending diamond edge overfill 564, a thinner diamond or PCD coating may be utilized in adjusting wear characteristics vs. cost. It should be noted that the overfill 564 is a natural phenomenon that occurs during the high pressure, high temperature process thereby reducing the manufacturing costs, if used without the overfill being removed, of the tip insert 562.

Figure 61:
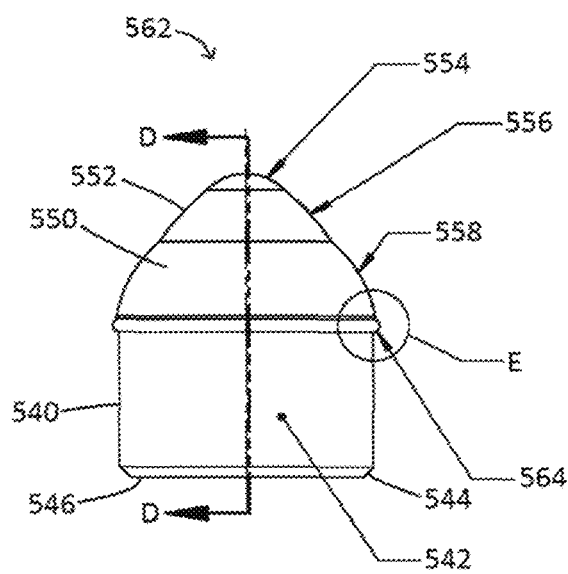
FIG. 61 is an elevation view of a tenth embodiment of a tip insert in accordance with implementations of this disclosure.
Figure 62:
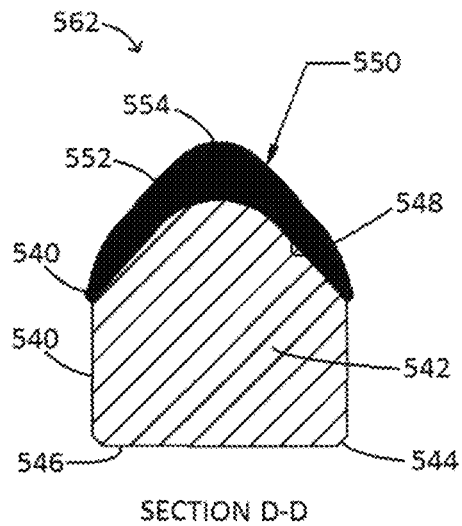
FIG. 62 is an elevation view of the tenth embodiment of the tip insert taken along line D-D of FIG. 61, showing the diamond layer in solid black and the substrate in hatching lines, in accordance with implementations of this disclosure.
Figure 63:
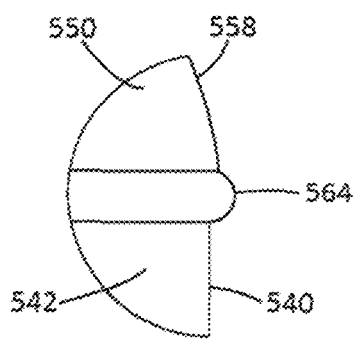
FIG. 63 is a detail side elevation view of Detail D of FIG. 58 of the ninth embodiment of the tip insert in accordance with implementations of this disclosure.

Referring to FIGS. 61-63, a tenth embodiment of a tip insert 562, that includes parabolic curved sections below an apex of the tip insert 562. The tip insert 562 of the tenth embodiment is substantially the same as the tip insert 480 of the eighth embodiment with an exception that the overlay 550 of the tip insert 562 does not include a generally cylindrical section adjacent the second parabolic section 558. The overlay 550 includes a ridge or overfill portion 564 adjacent the second parabolic section 558. The overfill or over formed portion 564 may not be regular in shape and does not need to be ground or removed into any specific shape. This added diameter also affects the shape of the finished surface as will be discussed in more detail below. It should be noted that with the greater diameter and outward extending diamond edge overfill 564, a thinner diamond or PCD coating may be utilized in adjusting wear characteristics vs. cost. It should be noted that the overfill 564 is a natural phenomenon that occurs during the high pressure, high temperature process thereby reducing the manufacturing costs, if used without the overfill being removed, of the tip insert 562.

Figure 49:
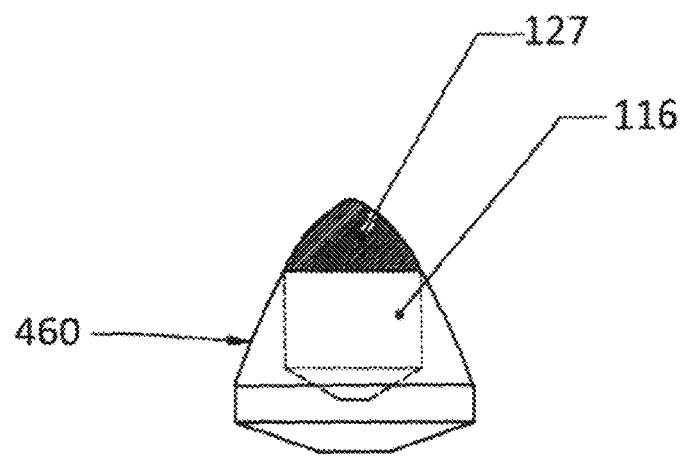
FIG. 49 is a front elevation view of the fourth embodiment of the tip insert, shown in a prior art bolster, in accordance with implementations of this disclosure.
Figure 50:
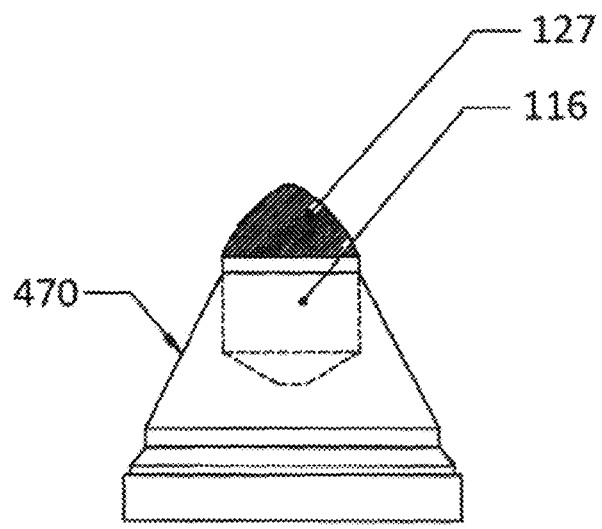
FIG. 50 is a front elevation view of the fourth embodiment of the tip insert, shown in another prior art bolster, in accordance with implementations of this disclosure.
Figure 51:
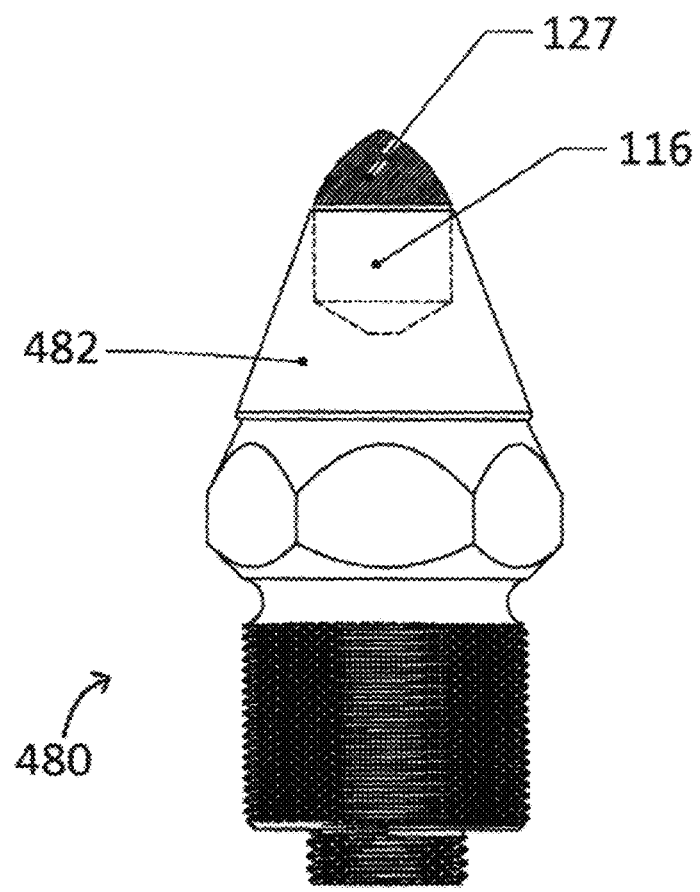
FIG. 51 is a front elevation view of the fourth embodiment of the tip insert, shown in a prior art cutter tip, in accordance with implementations of this disclosure.
Figure 52:
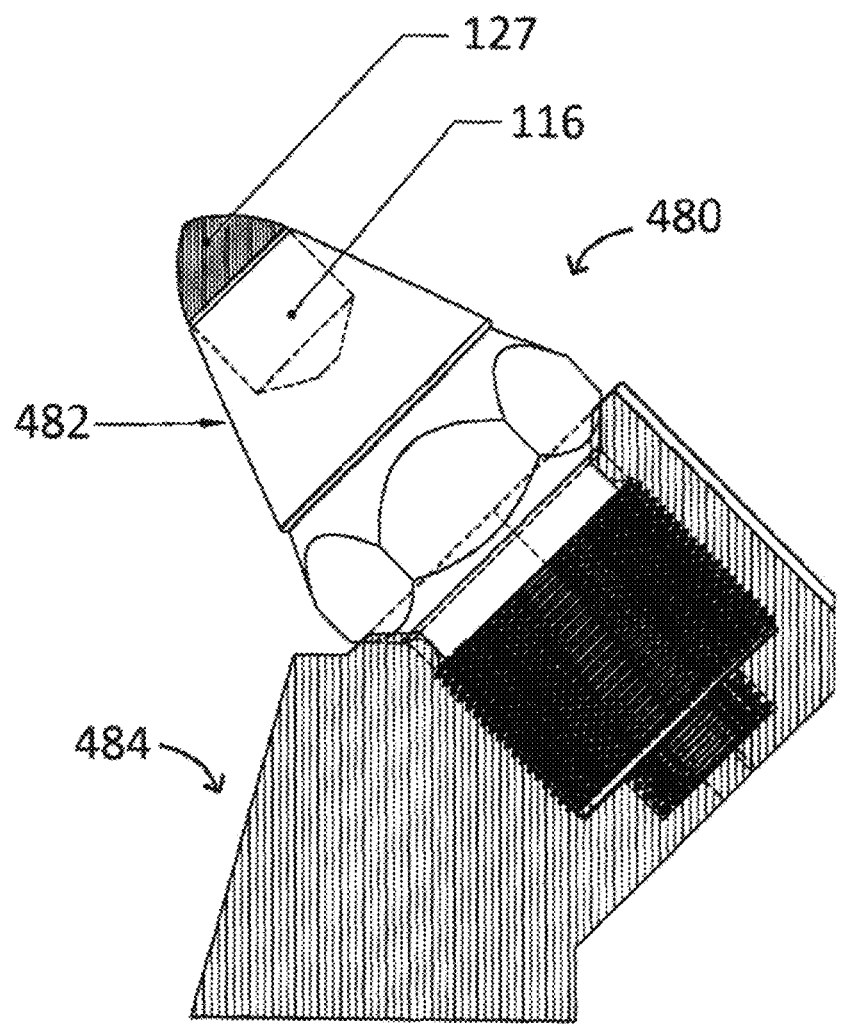
FIG. 52 is a side elevation view of the fourth embodiment of the tip insert, shown in a prior art cutter tip and base, in accordance with implementations of this disclosure.

The various embodiments of the tip inserts described in the present disclosure can also be used in various unitary bit/holder, picks, and/or bolsters, and the like, of the prior art. In two exemplary implementations, for illustration purposes, the tip insert 116 of the fourth embodiment, described above, may be fitted in bolster 460 of the prior art, as shown in FIG. 49, and/or may be fitted in bolster 470 of the prior art, as shown in FIG. 50, which is in turn fitted in a tool and/or unitary bit/holder. In another exemplary implementation, for illustration purposes, the tip insert 116 of the fourth embodiment, described above, may also be fitted in a bolster 482 of cutter tip 480 (FIG. 51), as described in U.S. Pat. No. 8,528,990 to Latham, and then fitted into base 484, as shown in FIG. 52.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments and measurements, it is to be understood that the invention is not to be limited to the disclosed embodiments and measurements but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A bit/holder comprising:
 a body comprising a bore extending inwardly from a forward end of the body, the bore including a bore termination;
 a shank extending centrally axially from a distal end of the body; and
 a bit tip insert disposed in the bore, the bit tip insert comprising:
  a body comprising an overlay and a base subjacent the overlay, the base comprising a forward end including a convex base tip merging into a conical side; and
  an outer surface of the overlay comprising a tip, a plurality of convex parabolic sections adjacent the tip, and a generally cylindrical section adjacent the plurality of parabolic sections.

2. The bit/holder of claim 1, wherein the overlay comprises at least one of a polycrystalline diamond, industrial diamond, natural diamond, polycrystalline diamond composite material, and polycrystalline diamond compact material.

3. The bit/holder of claim 1, wherein the overlay comprises at least one of:
at least one coating on the outer surface of the tip; and
at least one layer on the outer surface of the tip.

4. The bit/holder of claim 1, wherein the overlay is formed by a high pressure high temperature (HPHT) process.

5. The bit/holder of claim 1, wherein the base is made of at least one of steel and tungsten carbide.

6. The bit/holder of claim 1, wherein the base is one of cylindrical and tapered inwardly toward a bottom of the base.

7. The bit/holder of claim 1, wherein the bit/holder is non-rotating.

8. The bit/holder of claim 1, further comprising at least one of:
an apex of the tip comprising a radius of curvature of 0.160 inch; and
the overlay including a thickness in the range of and including 0.080 inch to 0.125 inches.

9. A bit/holder comprising:
a body comprising a bore extending inwardly from a forward end of the body, the bore including a bore termination;
a shank extending centrally axially from a distal end of the body; and
a bit tip insert disposed in the bore, the bit tip insert comprising:
a body comprising a base and an overlay adjacent a forward end of the base; and
an outer surface of the overlay comprising a tip, a plurality of convex parabolic sections adjacent the tip, and a generally cylindrical section adjacent the plurality of parabolic sections; and
an overfill portion extending outwardly of a widest portion of the body, the overfill portion adjacent the generally cylindrical section.

10. The bit/holder of claim 9, wherein the overfill portion is an excess of the overlay formed by a high pressure high temperature (HPHT) process that bonds at least one of at least one coating and at least one layer of diamond material on the outer surface of the tip.

11. A bit/holder comprising:
a body comprising a bore extending inwardly from a forward end of the body, the bore including a bore termination;
a shank extending centrally axially from a distal end of the body; and
a bit tip insert disposed in the bore, the bit tip insert comprising:
a body comprising a base and an overlay adjacent a forward end of the base; and
an outer surface of the overlay comprising a tip, a plurality of parabolic sections adjacent the tip, and an overfill portion extending outwardly of a widest portion of the body, the overfill portion adjacent the plurality of parabolic sections.

12. The bit/holder of claim 11, wherein the overlay comprises at least one of a polycrystalline diamond, industrial diamond, natural diamond, polycrystalline diamond composite material, and polycrystalline diamond compact material.

13. The bit/holder of claim 11, wherein the overlay comprises at least one of:
at least one coating on the outer surface of the tip; and
at least one layer on the outer surface of the tip.

14. The bit/holder of claim 11, wherein the overlay is formed by a high pressure high temperature (HPHT) process.

15. The bit/holder of claim 11, wherein the base is made of at least one of steel and tungsten carbide.

16. The bit/holder of claim 11, wherein the base is one of cylindrical and tapered inwardly toward a bottom of the base.

17. The bit/holder of claim 16, further comprising:
a generally cylindrical section disposed adjacent a distal end of the plurality of parabolic sections and adjacent a forward end of the overfill portion.

18. The bit/holder of claim 16, wherein the overfill portion is an excess of the overlay formed by a high pressure high temperature (HPHT) process that bonds at least one of at least one coating and at least one layer of diamond material on the outer surface of the tip.

19. The bit/holder of claim 11, wherein the bit/holder is non-rotating.

20. The bit/holder of claim 11, further comprising at least one of:
an apex of the tip comprising a radius of curvature of 0.160 inch; and
the overlay including a thickness in the range of and including 0.080 inch to 0.125 inches.

* * * * *